(12) United States Patent
Kim

(10) Patent No.: US 11,846,995 B2
(45) Date of Patent: Dec. 19, 2023

(54) DISPLAY DEVICE INCLUDING A SUPPORT MODULE HAVING JOINTS

(71) Applicant: SAMSUNG DISPLAY CO., LTD., Yongin-si (KR)

(72) Inventor: Tae Chang Kim, Anyang-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/814,169

(22) Filed: Jul. 21, 2022

(65) Prior Publication Data
US 2023/0176624 A1 Jun. 8, 2023

(30) Foreign Application Priority Data
Dec. 7, 2021 (KR) .......................... 10-2021-0173844

(51) Int. Cl.
*G06F 1/16* (2006.01)
(52) U.S. Cl.
CPC .......... *G06F 1/1656* (2013.01); *G06F 1/1624* (2013.01)
(58) Field of Classification Search
CPC .................................................. G06F 1/1652
See application file for complete search history.

(56) References Cited

U.S. PATENT DOCUMENTS

| | | | |
|---|---|---|---|
| 9,756,757 B2 * | 9/2017 | Park | H05K 7/16 |
| 9,829,924 B2 * | 11/2017 | Shin | G06F 1/1656 |
| 10,013,084 B2 * | 7/2018 | Kang | G06F 3/0446 |
| 10,019,036 B2 * | 7/2018 | Sun | G06F 1/1652 |
| 10,073,491 B2 * | 9/2018 | Choi | G06F 11/3051 |
| 10,095,273 B2 * | 10/2018 | Choi | G06F 1/1641 |
| 10,185,367 B2 * | 1/2019 | Kim | G06F 1/1675 |
| 10,289,164 B2 * | 5/2019 | Seo | F16M 11/38 |
| 10,694,623 B2 * | 6/2020 | Park | H05K 5/0226 |
| 10,698,448 B2 * | 6/2020 | Watanabe | H05B 33/02 |
| 10,783,809 B2 * | 9/2020 | Kim | G09F 9/301 |
| 10,827,630 B2 * | 11/2020 | Kim | G06F 1/1652 |
| 10,852,774 B2 * | 12/2020 | Dong | H04M 1/0214 |
| 11,089,695 B2 * | 8/2021 | Park | H05K 5/0017 |
| 11,106,358 B2 * | 8/2021 | Yoon | G06F 1/1652 |
| 11,178,784 B2 * | 11/2021 | Araki | H05K 5/0017 |
| 11,418,691 B2 * | 8/2022 | Kim | H04N 23/695 |
| 2015/0325804 A1 * | 11/2015 | Lindblad | G06F 3/0362 313/511 |

(Continued)

FOREIGN PATENT DOCUMENTS

KR 10-2016-0031363 3/2016
KR 10-2019-0003257 1/2019

(Continued)

*Primary Examiner* — Adrian S Wilson

(57) ABSTRACT

A display device includes a display panel including a first area and a second area. A support module includes a first support layer disposed on a bottom of the display panel and overlapping the first area and the second area. A second support layer is disposed on a bottom of the first support layer, overlapping the second area, and not overlapping the first area. The first support layer includes first joints overlapping the second area, and a plate overlapping the first area. The second support layer includes second joints. Each of the second joints is disposed on a bottom surface of each of the first joints, and a width of each of the second joints is narrower than a width of each of the first joints.

20 Claims, 38 Drawing Sheets

PNL: PNL_1, PNL_2, PNL_3
1100: 1110, 1130
1300: 1310
SP: SP_1, SP_2, SP_3
SP_1: 1130
SP_2: 1110, 1310
SP_3: 1110, 1310

(56) References Cited

U.S. PATENT DOCUMENTS

| | | | | |
|---|---|---|---|---|
| 2017/0142847 A1* | 5/2017 | Park | ...................... | G06F 1/1652 |
| 2017/0156219 A1* | 6/2017 | Heo | ...................... | G06F 1/1679 |
| 2017/0359910 A1* | 12/2017 | Seo | ...................... | H05K 5/0217 |
| 2018/0284964 A1* | 10/2018 | Kang | .................. | H04M 1/0268 |
| 2018/0341293 A1* | 11/2018 | Kim | ...................... | G06F 1/1641 |
| 2019/0082544 A1* | 3/2019 | Park | ...................... | H05K 5/0226 |
| 2020/0302834 A1* | 9/2020 | Ochi | ....................... | G09F 9/301 |
| 2022/0046811 A1* | 2/2022 | Kim | ...................... | G06F 1/1624 |
| 2022/0272853 A1* | 8/2022 | Kim | ...................... | G06F 1/1616 |
| 2023/0176614 A1* | 6/2023 | Kim | ...................... | G06F 1/1652 |
| | | | | 361/679.01 |
| 2023/0180403 A1* | 6/2023 | Ahn | ....................... | G09F 9/301 |
| | | | | 361/807 |

FOREIGN PATENT DOCUMENTS

| | | |
|---|---|---|
| KR | 10-2019-0081335 | 7/2019 |
| KR | 10-2019-0143029 | 12/2019 |
| KR | 10-2021-0026591 | 3/2021 |

* cited by examiner

PNL: PNL_1, PNL_2, PNL_3, SBA
SP: SP_1, SP_2, SP_3

1100': 1110', 1130'
1300': 1310', 1330'

1100: 1110, 1130
1300: 1310

DISPLAY DEVICE INCLUDING A SUPPORT MODULE HAVING JOINTS

CROSS-REFERENCE TO RELATED APPLICATION

This application claims priority under 35 U.S.C. § 119 to Korean Patent Application No. 10-2021-0173844 filed on Dec. 7, 2021 in the Korean Intellectual Property Office, the contents of which are herein incorporated by reference in its entirety.

TECHNICAL FIELD

The present disclosure relates to a display device and, more specifically, to a display device including a support module having joints.

DISCUSSION OF THE RELATED ART

Display devices have increasingly become an important part of modern electronic devices owing to the development of multimedia. Accordingly, various types of display devices such as an organic light emitting diode (OLED) display and a liquid crystal display (LCD) are being used.

Some display devices incorporate bendable display panels that may be repeatedly bent, folded, flexed, or rolled, to a noticeable degree without sustaining damage. Bendable display panels have allowed for the creation of electronic devices with new and interesting form factors.

SUMMARY

A display device includes, a display panel including a first area and a second area positioned on one side of the first area in a first direction and a support module including a first support layer disposed on a bottom surface of the display panel and overlapping the first area and the second area, and a second support layer disposed on a bottom surface of the first support layer, overlapping the second area, and not overlapping the first area. The first support layer of the support module includes a plurality of first joints spaced apart from each other in the first direction and overlapping the second area, and a plate integrally formed in the first direction and overlapping the first area. The second support layer of the support module includes a plurality of second joints spaced apart from each other in the first direction, each of the plurality of second joints is disposed on a bottom surface of each of the plurality of first joints, and a width of each of the plurality of second joints is narrower than a width of each of the plurality of first joints.

A top surface of each of the plurality of second joints may be disposed in a central portion of the bottom surface of each of the plurality of first joints and may be in direct contact with the first joint.

A shape of each of the plurality of first joints, in a plan view, and a shape of each of the plurality of second joints, in a plan view, may be shapes similar to a rectangle.

The plurality of first joints, the plurality of second joints, and the plate may include a same material.

A thickness of each of the plurality of first joints and a thickness of the plate may be the same, and a thickness of each of the plurality of second joints is greater than the thickness of each of the plurality of first joints.

The display panel may further include a third area disposed on another side of the first area in the first direction and a sub area disposed on one side of the first area in a second direction intersecting the first direction. The first support layer of the support module may overlap the first area, the second area, and the third area, and the second support layer may overlap the second area and the third area and might not overlap the first area. The plurality of first joints of the first support layer may overlap the second area and the third area, and may be spaced apart from each other in the first direction. The plurality of second joints of the second support layer may overlap the second area and the third area, and may be spaced apart from each other in the first direction. An air gap may be disposed on a bottom surface of the plate of the first support layer.

The plurality of first joints may be spaced apart from each other by a first width, and the plurality of second joints may be spaced apart from each other by a second width that is greater than the first width.

The first width may be 0.9 mm or less.

A display device includes, a display panel including a flat area and a bendable area adjacent to the flat area in a first direction. A first support member is formed on a bottom surface of the display panel and overlaps the flat area. A second support member is formed on the bottom surface of the display panel and overlaps the bendable area. The first support member is a flat plate extending in the first direction and a second direction intersecting the first direction, and includes a same material as the second support member. The second support member includes a plurality of first joints extending in the second direction, spaced apart from each other by a first width in the first direction, and having the same thickness as a thickness of the first support member, and a plurality of second joints extending in the second direction, spaced apart from each other in the first direction by a second width that is greater than the first width, and having a thickness that is greater than the thickness of the first support member. Each of the plurality of second joints is attached to a bottom surface of each of the plurality of first joints.

The display device may further include a plurality of first joint adhesive layers interposed between each of the plurality of first joints and each of the plurality of second joints. A width of each of the plurality of first joint adhesive layers may be the same as a width of each of the plurality of second joints.

Each of the plurality of first joint adhesive layers may have an adhesive force of 1800 gf/25 mm or more.

The display device may further include a joint adhesive film interposed between the plurality of first joints and the plurality of second joints to adhere the plurality of first joints and the plurality of second joints.

A shape of the joint adhesive film, in a plan view, may be substantially the same as a shape of the bendable area of the display panel, in a plan view.

The joint adhesive film may include a metal and may have a thickness of 40 µm or less.

The joint adhesive film may includes a polymer film and may have a modulus of elasticity of 4 GPa or more.

The joint adhesive film may have a mesh-type film including a plurality of fine holes each having a diameter of 300 µm or less.

A display device includes a display panel including a flat area and a bendable area adjacent to the flat area in a first direction. A first support member is formed on a bottom surface of the display panel, overlapping the flat area, and extending in the first direction and a second direction intersecting the first direction. A second support member is formed on the bottom surface of the display panel, overlapping the bendable area, extending in the second direction, and including a plurality of first joints spaced apart from each other in the first direction. The first support member and the second support member include z same metal. Each of the plurality of first joints includes a first bent portion having a first degree of curvature which is concave in a direction toward the inside of each of the plurality of first joints, and a second bent portion positioned on a lower side of the first bent portion and having a second degree of curvature which is concave in the direction toward the inside of each of the plurality of first joints.

A thickness of the first support member may be smaller than a thickness of each of the plurality of first joints.

The first degree of curvature may be greater than the second degree of curvature.

The first joint may include a joint protrusion portion that is a boundary between the first bent portion and the second bent portion, and has a maximum width in the first direction at the joint protrusion portion.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which embodiments of the invention are shown. This invention may, however, be embodied in different forms and should not necessarily be construed as limited to the embodiments set forth herein.

It will be understood that when a layer is referred to as being "on" another layer or substrate, it can be directly on the other layer or substrate, or intervening layers may also be present. The same reference numbers may indicate the same components throughout the specification and drawings.

It will be understood that, although the terms "first," "second," etc. may be used herein to describe various elements, these elements should not necessarily be limited by these terms. These terms are used to distinguish one element from another element. For instance, a first element discussed below could be termed a second element without departing from the teachings of the present disclosure. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, specific embodiments will be described with reference to the accompanying drawings.

Figure 1:
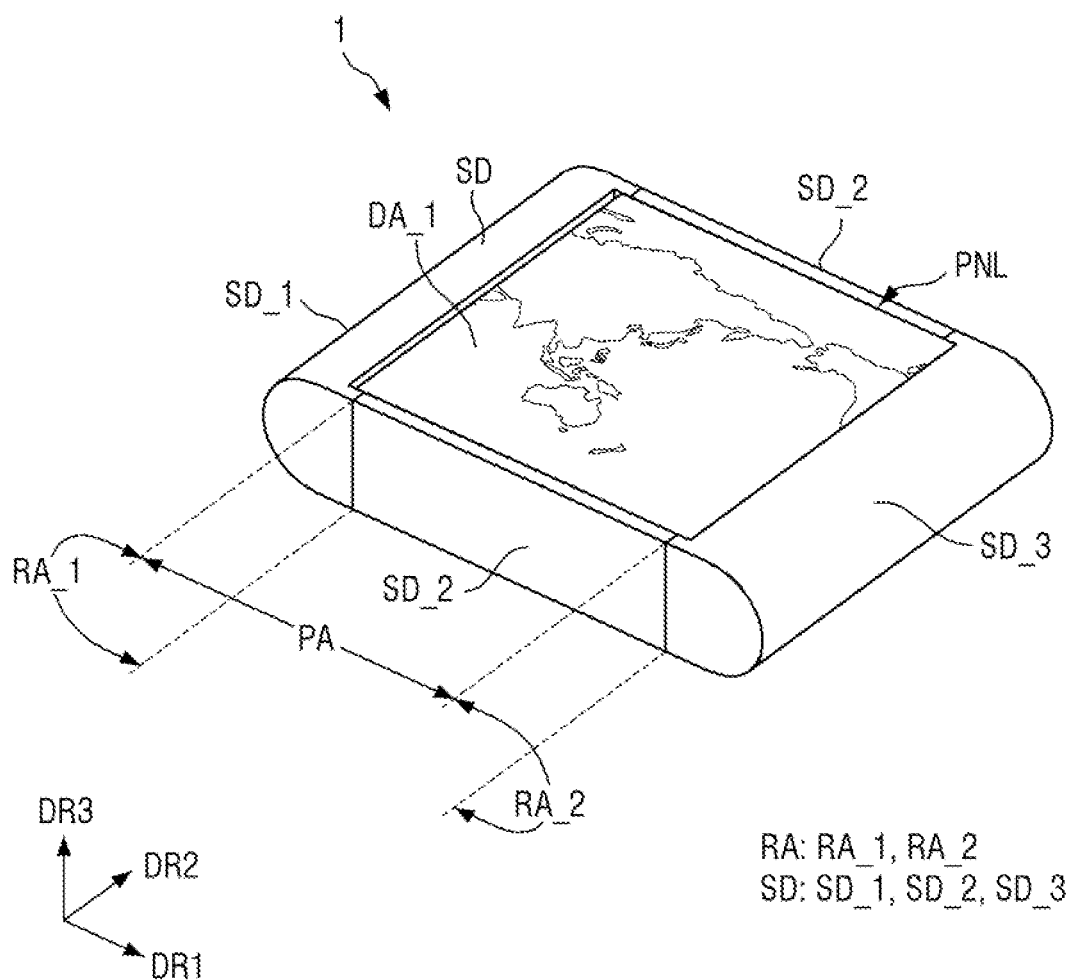
FIG. 1 is a perspective view of a display device according to an embodiment.
Figure 2:
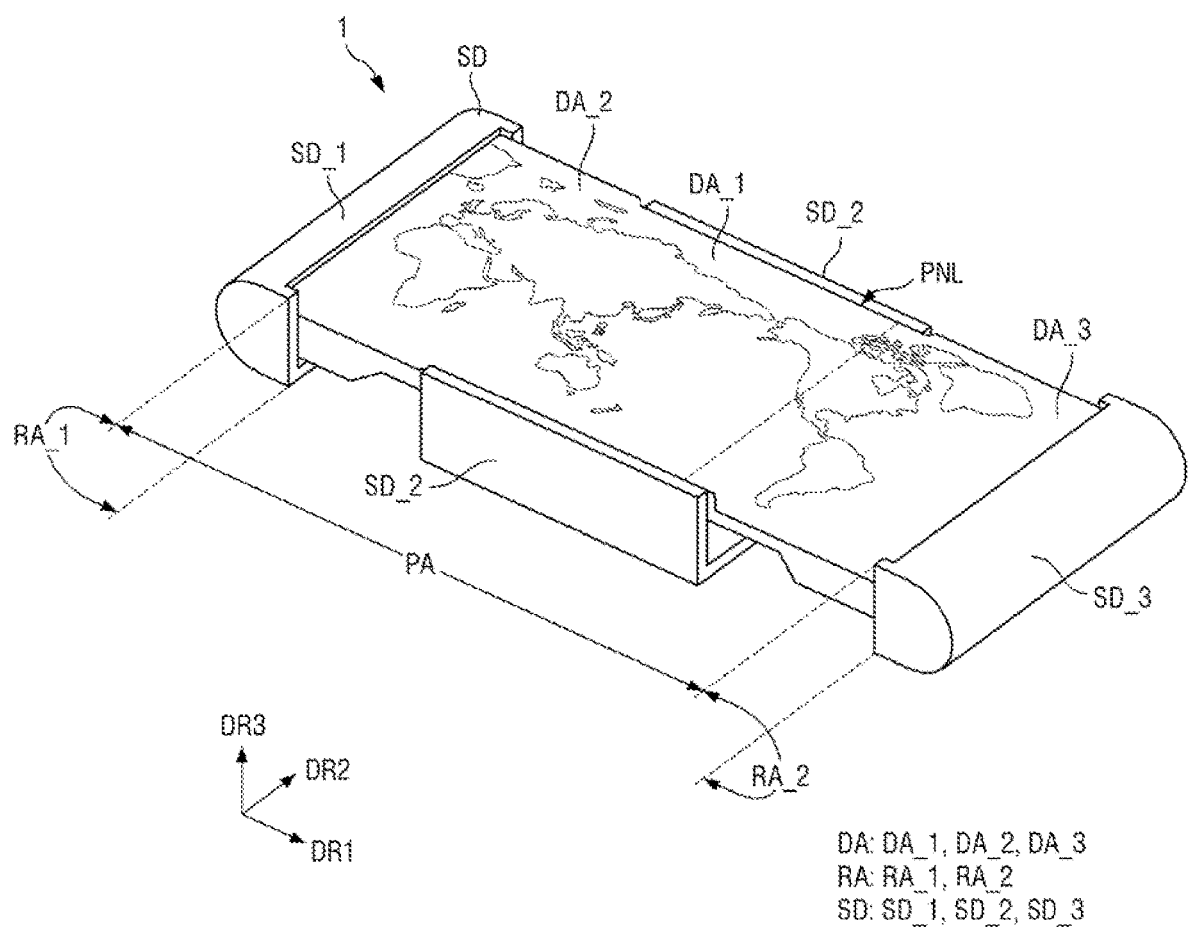
FIG. 2 is a perspective view illustrating an expanded state of the display device of FIG. 1.
Figure 3:
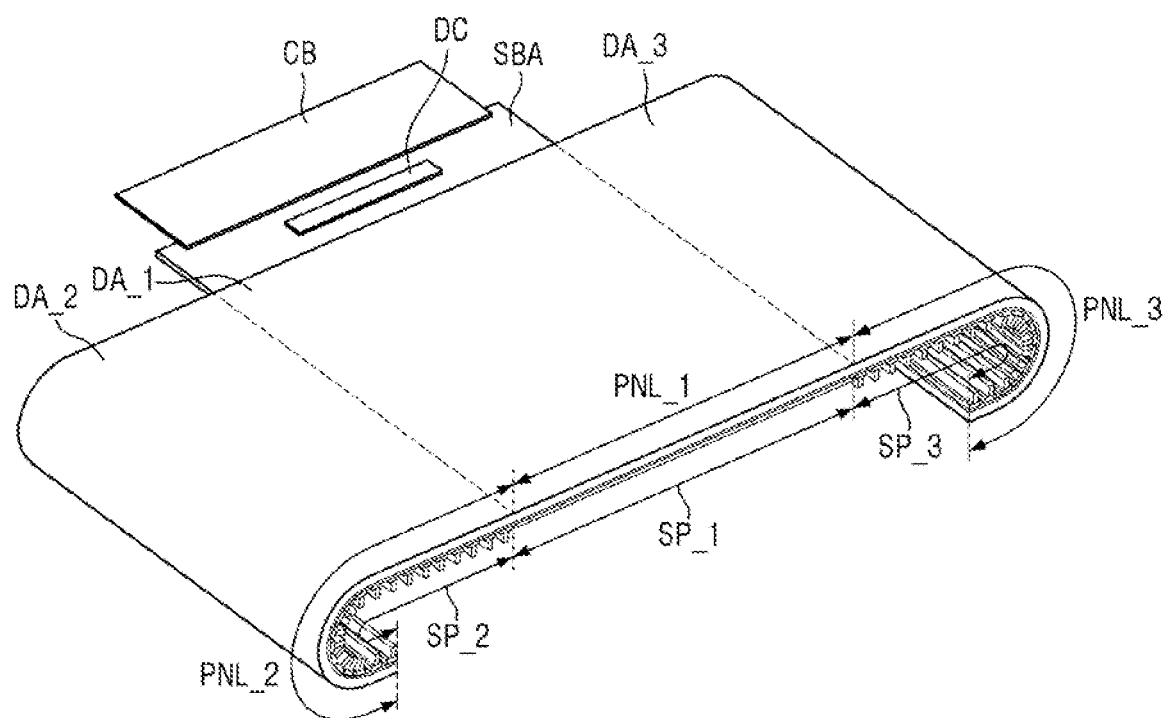
FIG. 3 is a perspective view illustrating an arrangement of a display panel and a support module of the display device of FIG. 1.
Figure 3:
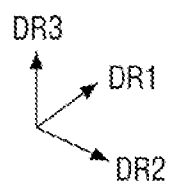
Figure 4:
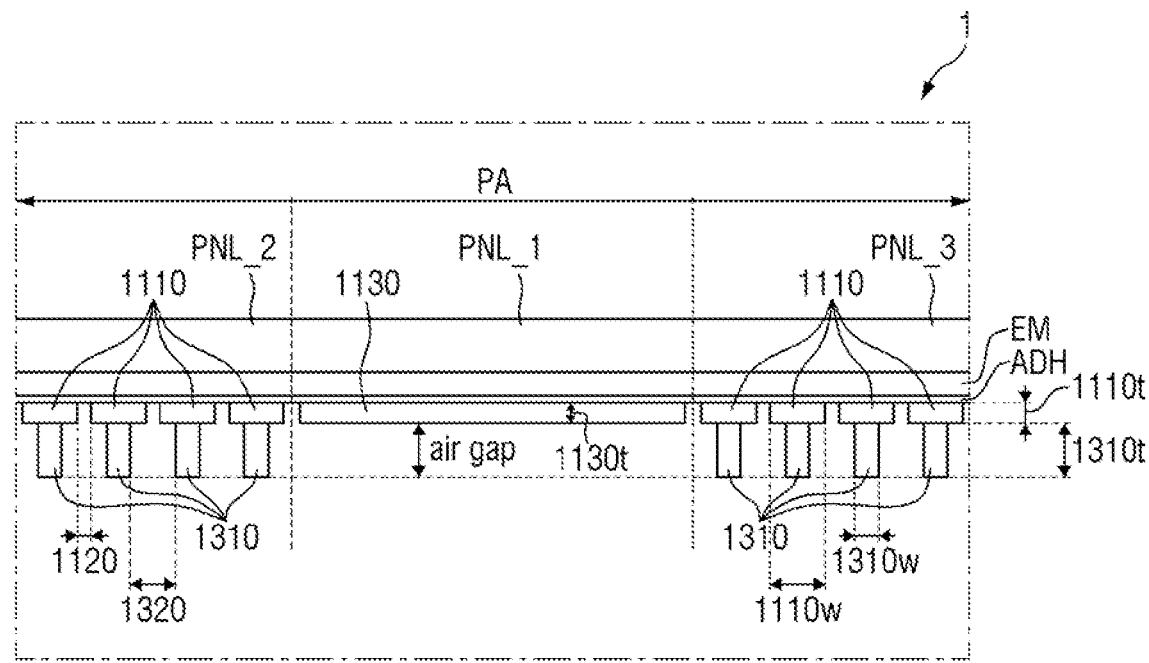
FIG. 4 is a cross-sectional view illustrating a stacked structure of the display panel and the support module of the display device of FIG. 1.
Figure 5:
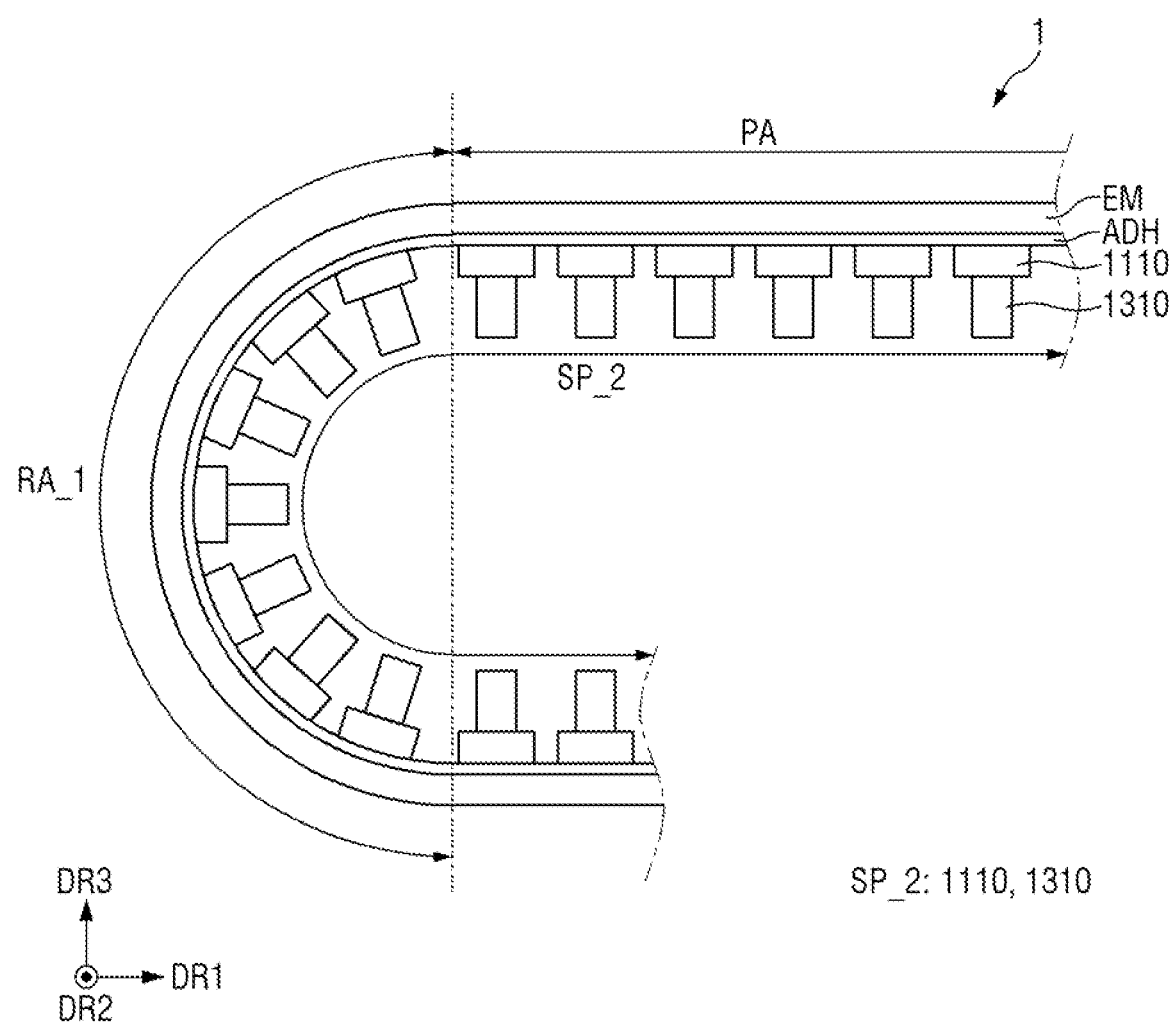
FIG. 5 is a cross-sectional view illustrating a behavior of the support module in a display device bent area of the display device of FIG. 1.
Figure 6:
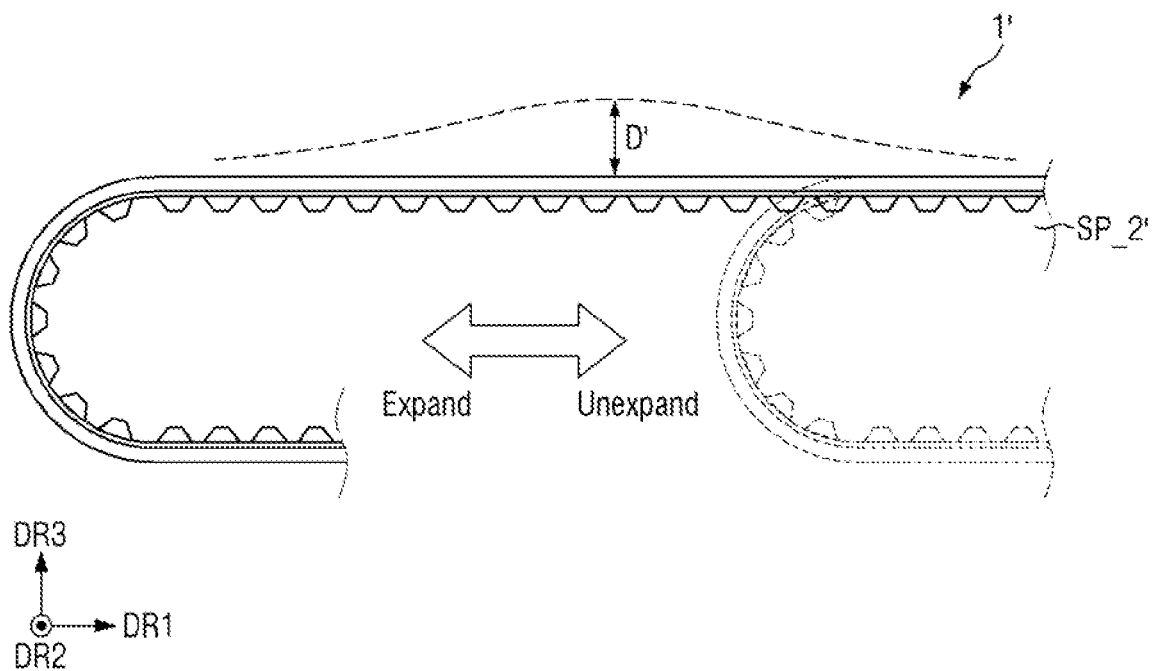
FIG. 6 is a cross-sectional view illustrating an amount of lifting of a display panel generated while a display device according to a comparative example is slid.
Figure 7:
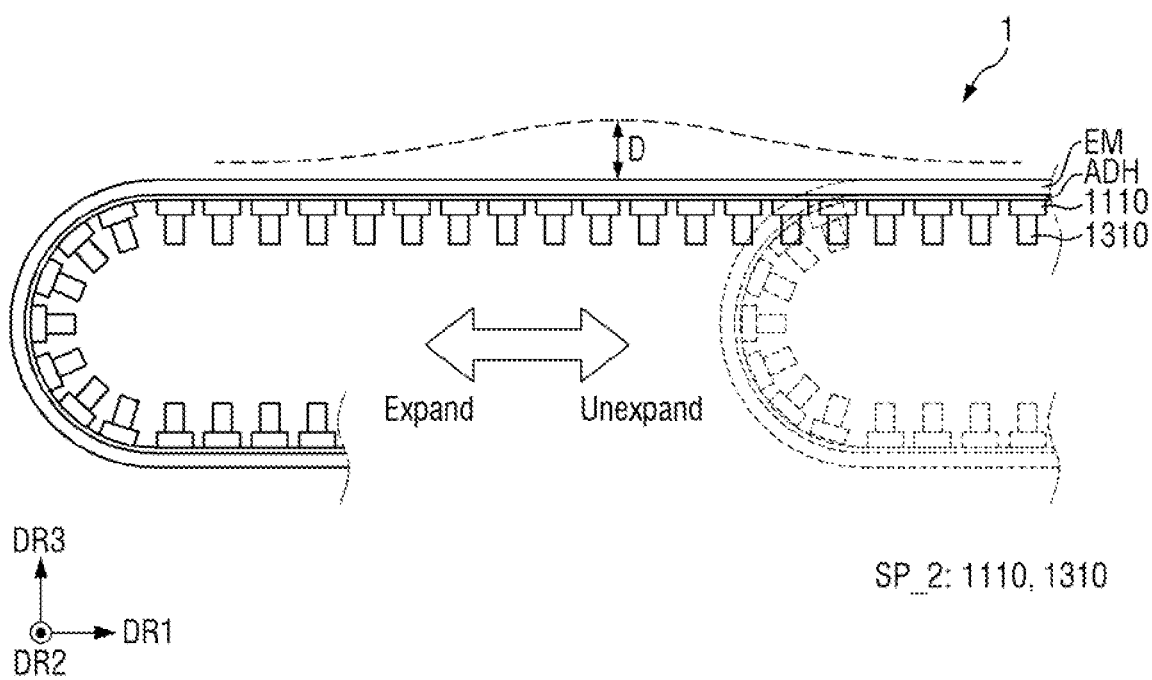
FIG. 7 is a cross-sectional view illustrating an amount of lifting of a display panel generated while the display device of FIG. 1 is slid.
Figure 8:
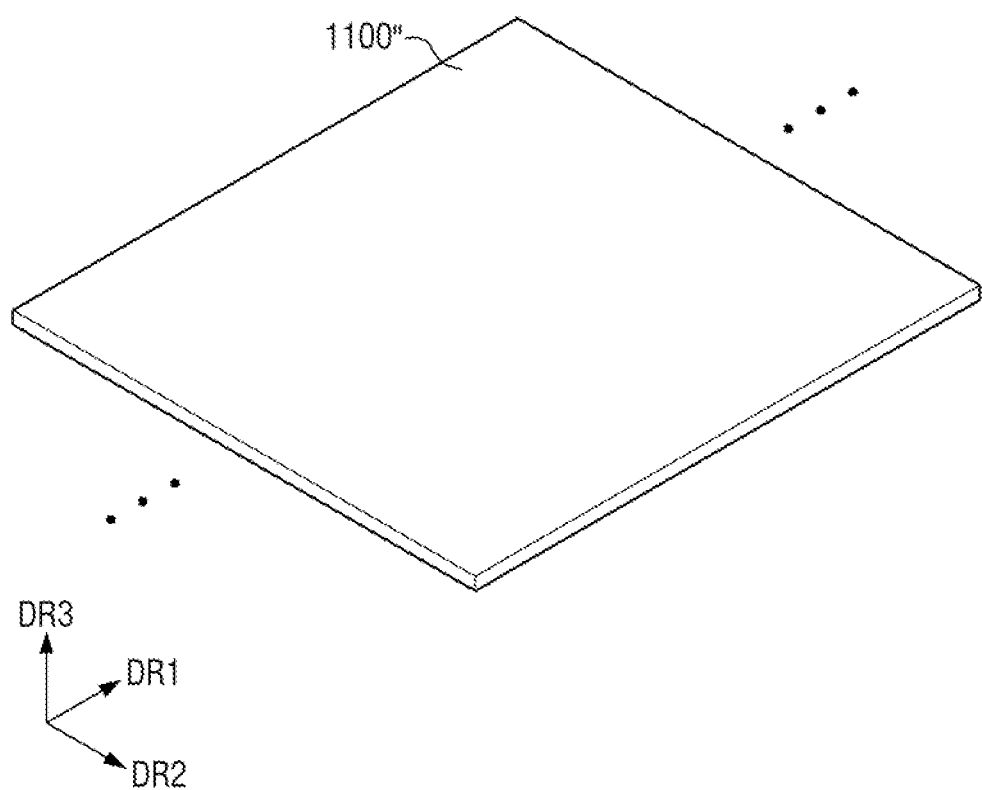
FIGS. 8 to 22 are cross-sectional views and perspective views illustrating a manufacturing process of manufacturing the display device of FIG. 1.

FIG. 1 is a perspective view of a display device according to an embodiment. FIG. 2 is a perspective view illustrating an expanded state of the display device of FIG. 1. FIG. 3 is a perspective view illustrating an arrangement of a display panel and a support module of the display device of FIG. 1. FIG. 4 is a cross-sectional view illustrating a stacked structure of the display panel and the support module of the display device of FIG. 1. FIG. 5 is a cross-sectional view illustrating a behavior of the support module in a display device bent area of the display device of FIG. 1. FIG. 6 is a cross-sectional view illustrating an amount of lifting of a display panel generated while a display device according to a comparative example is slid. FIG. 7 is a cross-sectional view illustrating an amount of lifting of a display panel generated while the display device of FIG. 1 is slid.

Referring to FIGS. 1 and 2, a display device 1, according to an embodiment, may be a slidable sliding display device or a slidable display device. The display device 1, according to an embodiment, may be a multi-slidable display device that slides in both directions (e.g., both the left side and the right side are configured to slide open and closed), but is not necessarily limited thereto. For example, the display device 1 may be a single slidable display device that slides in only one direction (e.g., only one side slides open and closed). Hereinafter, the multi-slidable display device will be mainly described.

The display device 1 has a three-dimensional shape. For example, the display device 1 may have a rectangular parallelepiped shape or a three-dimensional shape similar thereto. In the drawings, a first direction DR1 refers to a direction parallel to a first side (horizontal side) of the display device 1, a second direction DR2 refers to a direction parallel to a second side (vertical side) of the display device 1, and a third direction DR3 refers to a thickness direction of the display device 1. In the following specification, unless otherwise specified, the term "direction" may refer to both directions toward opposite sides extending along the direction. In addition, when both "directions" extending to opposite sides need to be distinguished from each other, one side will be referred to as "one side in the direction" and the other side will be referred to as "the other side in the direction". In FIG. 1, an arrow direction will be referred to as one side, and an opposite direction to the arrow direction will be referred to as the other side. The first direction DR1 and the second direction DR2 may be perpendicular to each other, the first direction DR1 and the third direction DR3 may be perpendicular to each other, and the second direction DR2 and the third direction DR3 may be perpendicular to each other.

The display device 1 may include a display device flat area PA and a display device bent area RA. The display device flat area PA of the display device 1 substantially overlaps an area exposing a display panel PNL of a panel storage container SD to be described later. The display device bent area RA of the display device 1 may be located inside the panel storage container SD. The display device bent area RA may be disposed on opposite sides of the display device flat area PA in the first direction DR1. For example, a first display device bent area RA_1 may be disposed on the other side of the display device flat area PA in the first direction DR1, and a second display device bent area RA_2 may be disposed on one side of the display device flat area PA in the first direction DR1. As illustrated in FIG. 2, an area of the display device flat area PA may increase as the display device 1 expands.

Referring to FIGS. 1 to 5, the display device 1 may include a display panel PNL, a support module SP, an elastic member EM, and a panel storage container SD.

The display panel PNL is a panel that displays an image, for example, any type of display panel such as an organic light emitting diode (OLED) display panel including an organic emission layer, a micro light emitting diode (LED) display panel using a micro light emitting diode, a quantum dot light emitting display panel using a quantum dot light emitting diode including a quantum dot emission layer, and an inorganic light emitting display panel using an inorganic light emitting element including an inorganic semiconductor may be applied as the display panel PNL according to the present embodiment.

The display panel PNL may be a flexible panel. The display panel PNL may have flexibility to be at least partially rolled, bent, or warped, to a noticeable degree without sustaining damage, in a panel storage container SD of a sliding module, as will be described later. The display panel PNL may slide in the first direction DR1.

The display panel PNL may include a first area PNL_1 supported by a first support member SP_1, a second area PNL_2 supported by a second support member SP_2, and a third area PNL_3 supported by a third support member SP_3 to be described later. The various support members may be referred to herein as "supports". The first area PNL_1 of the display panel PNL may be a normally flat area capable of maintaining a flat shape regardless of a sliding operation. The second area PNL_2 and the third area PNL_3 of the display panel PNL may be rolled, bent, or warped, or may be a bent area or a bendable area in which a rolled, bent, or warped shape and a flat shape are changed according to a sliding operation.

One surface of the display panel PNL in the third direction DR3 may be a top surface for displaying a screen, and the other surface of the display panel PNL in the third direction DR3 may be a bottom surface on which the support module SP is disposed.

The display area DA of the display panel PNL may be divided into a first display area DA_1, a second display area DA_2, and a third display area DA_3, depending on whether or not the display panel PNL slides and the degree of sliding of the display panel PNL. The presence or absence of the second display area DA_2 and the third display area DA_3 and the areas thereof may vary depending on whether or not the display panel PNL slides and the degree of sliding of the display panel PNL. For example, in a non-sliding state (hereinafter, referred to as a "first state"), the display panel PNL has the first display area DA_1 having a first area. In a sliding state (hereinafter, referred to as a "second state"), the display area further includes the second display area DA_2 and the third display area DA_3 that are extended, in addition to the first display area DA_1.

The second display area DA_2 may be an area in which the second area PNL_2 of the display panel PNL and the display device flat area PA overlap, and the third display area DA_3 may be an area in which the third area PNL_3 of the display panel PNL and the display device flat area PA overlap.

The areas of the second display area DA_2 and the third display area DA_3 may vary according to the degree of sliding. When the display device 1 is slid to the maximum, the second display area DA_2 has a second area and the third display area DA_3 has a third area, and the display area DA has a fourth area that is the sum of the first area, the second area, and the third area. Here, the fourth area may be the maximum area that the display area DA may have.

The first display area DA_1 may overlap the first area PNL_1 of the display panel PNL. The second display area DA_2 may overlap at least a portion of the second area PNL_2 of the display panel PNL. The third display area DA_3 may overlap at least a portion of the third area PNL_3 of the display panel PNL. In some embodiments, a boundary between the first display area DA_1 and the second display area DA_2 may coincide with a boundary between the first area PNL_1 and the second area PNL_2, and the boundary between the first display area DA_1 and the second display area DA_2 may coincide with a boundary between the first area PNL_1 and the third area PNL_3, but the present invention is not necessarily limited thereto.

The display panel PNL may further include a sub-area. The sub-area SBA may be disposed on one side of the first area PNL_1 of the display panel PNL in the second direction DR2. The sub-area SBA may be an area that is warped or bent. When the sub-area SBA is bent, the sub-area SBA may overlap the first area PNL_1 in the third direction DR3. The sub-area SBA may have a rectangular shape in a plan view, but is not necessarily limited thereto.

A length of the sub-area SBA in the first direction DR1 may be substantially the same as a length of the first area PNL_1 in the first direction DR1. Alternatively, the length of the sub-area SBA in the first direction DR1 may be smaller than the length of the first area PNL_1 in the first direction DR1. A length of the sub-area SBA in the second direction DR2 may be smaller than a length of the first area PNL_1 in the second direction DR2.

A driving circuit DC and a circuit board CB may be disposed on one side surface of the sub-area SBA in the third direction DR3. The circuit board CB may be attached onto the sub-area SBA using an anisotropic conductive film (ACF). The circuit board CB may be electrically connected to a pad portion formed on the sub-area SBA. The circuit board CB may be a flexible film such as a flexible printed circuit board, a printed circuit board, or a chip on film. The driving circuit DC may be formed as an integrated circuit (IC) and be adhered onto the sub-area SBA in a chip on glass (COG) manner, a chip on plastic (COP) manner, or an ultrasonic manner. Alternatively, the driving circuit DC may be adhered onto the circuit board CB.

The support module SP may support the display panel PNL by being attached to the bottom surface of the display panel PNL. The support module SP may include a first support member SP_1, a second support member SP_2, and a third support member SP_3. The first support member SP_1, the second support member SP_2, and the third support member SP_3 may have substantially the same relative positional relationship with the display panel PNL. For example, when the display panel PNL is unfolded to be flat without being bent, at least one surface parallel to the display panel PNL may simultaneously pass through the first support member SP_1, the second support member SP_2, and the third support member SP_3.

The support module SP may include a first support layer 1100 and a second support layer 1300. For example, the first support member SP_1 of the support module SP may include the first support layer 1100, and the second support member SP_2 and the third support member SP_3 of the support module SP may include the first support layer 1100 and the second support layer 1300. The first support layer 1100 may include a plurality of first joints 1110 and a plate 1130, and the second support layer 1300 may include a plurality of second joints 1310. The first support layer 1100 and the second support layer 1300 may include a metal material having appropriate rigidity so that the first support member SP_1, the second support member SP_2, and the third support member SP_3 support the display panel PNL with minimum flexing, respectively. In some embodiments, the first support layer 1100 and the second support layer 1300 may be made of a metal such as a stainless steel alloy, for example, SUS304, but is not necessarily limited thereto. Hereinafter, for convenience of explanation, it will be mainly described that the first support layer 1100 and the second support layer 1300 include a metal. The first support layer 1100 and the second support layer 1300 may include the same material. For example, the first support member SP_1, the second support member SP_2, and the third support member SP_3 may include the same material. This may be due to a result of a manufacturing process of the display device 1 to be described later.

The first support member SP_1 may support the first area PNL_1 of the display panel PNL. The first support member SP_1 may have a shape extending in the first direction DR1 and the second direction DR2 in a plan view. The first support member SP_1 may include a portion of the first support layer 1100. For example, the first support member SP_1 may have a substantially flat (e.g. planar) shape in a plan view and may include a plate 1130 supporting the first area PNL_1 of the display panel PNL. The plate 1130 may be disposed along a profile of the first area PNL_1 of the display panel PNL to have the same width (hereinafter, referred to as a "thickness" 1130t) in the third direction DR3. In some embodiments, the thickness of the plate 1130 may have a range of 0.1 mm to 0.5 mm, but is not necessarily limited thereto. The first support member SP_1 might not include the second support layer 1300.

The first support member SP_1 may be disposed on one side of the second support member SP_2 in the first direction DR1, and the third support member SP_3 may be disposed on one side of the first support member SP_1 in the first direction DR1. For example, the first support member SP_1 may be disposed between the second support member SP_2 and the third support member SP_3. The first support member SP_1 and the first area PNL_1 of the display panel PNL may overlap in the third direction DR3.

One side surface of the first support member SP_1 in the third direction DR3 may be a top surface attached to an elastic member EM to be described later, and the other side surface thereof in the third direction DR3 may be a bottom surface on which an air gap to be described later is disposed.

The second support member SP_2 may support the second area PNL_2 of the display panel PNL. The second support member SP_2 may overlap the second area PNL_2 in the third direction DR3. The second support members SP_2 may extend in the second direction DR2 and may be spaced apart from each other in the first direction DR1.

The second support member SP_2 may include a portion of the first support layer 1100 and the second support layer 1300. For example, the second support member SP_2 may include a plurality of first joints 1110 and a plurality of second joints 1310. The first joint 1110 of the second support member SP_2 may be included in the first support layer 1100, and the second joint 1310 thereof may be included in the second support layer 1300.

The plurality of first joints 1110 may have a shape extending in the second direction DR2. The plurality of first joints 1110 may be arranged along the first direction DR1. The first joints 1110 adjacent to each other may be spaced apart from each other by a predetermined interval. For example, the plurality of first joints 1110 may be spaced apart from each other in the first direction DR1 with a first width 1120. For example, a spaced space having the first width 1120 in the first direction DR1 may be disposed between the plurality of first joints 1110. As a spaced distance between the first joints 1110, i.e., the first width 1120, decreases, the visibility of the second support member on the display panel may be reduced. In some embodiments, the first width 1120 may have a range of 0.1 mm to 0.5 mm, but is not necessarily limited thereto. For example, the first width 1120 may be 0.9 mm or less.

A shape of the first joint 1110 in a plan view may be a rectangular shape as illustrated in FIG. 4. This may be due to a result of a manufacturing process of the display device 1 to be described later.

One side surface of the first joint 1110 in the third direction DR3 may be a top surface attached to an elastic member EM to be described later, and the other side surface thereof in the third direction DR3 may be a bottom surface on which the second joint 1310 is disposed.

The first joint 1110 and the second joint 1310 may be attached to each other. In some embodiments, as illustrated in FIG. 4, the bottom surface of the first joint 1110 and a top surface of the second joint 1310 may be welded so that the first joint 1110 and the second joint 1310 may be attached to each other, but the disclosure is not necessarily limited thereto. The top surface of the second joint 1310 may be in direct contact with a central portion of the bottom surface of the first joint 1110 and attached thereto.

The plurality of second joints 1310 may have a shape extending in the second direction DR2. The second joints 1310 may be arranged along the first direction DR1. The second joints 1310 adjacent to each other may be spaced apart from each other by a predetermined interval. For example, the plurality of second joints 1310 may be spaced apart from each other in the first direction DR1 with a second width 1320. The second width 1320 may be greater than the first width 1120. A shape of the second joint 1310 in a plan view may be a rectangular shape as illustrated in FIG. 4. This may be due to a result of a manufacturing process of the display device 1 to be described later.

A width (hereinafter, referred to as "thickness" 1310t) of the second joint 1310 in the third direction DR3 may be greater than a width (hereinafter, referred to as "thickness" 1110t) of the first joint 1110 in the third direction DR3. In addition, a width 1310w of the second joint 1310 in the first direction DR1 may be smaller than a width 1110w of the first joint 1110 in the first direction DR1.

By forming the thickness 1310t of the second joint 1310 to be greater than the thickness 1110t of the first joint 1110, the rigidity that is insufficient due to the thickness 1110t of the first joint 1110 formed to be relatively thin by a manufacturing process of the display device 1 to be described later may be compensated, and at the same time, by forming the width 1310w of the second joint 1310 to be narrower than the width 1110w of the first joint 1110, the second width 1320, which is the spaced distance between the second joints 1310 adjacent to each other, may be increased to prevent an occurrence of interference between the second joints 1310 adjacent to each other as illustrated in FIG. 5.

One side surface of the second joint 1310 in the third direction DR3 may be a top surface attached to the bottom surface of the first joint 1110, and the other side surface thereof in the third direction DR3 may be a bottom surface opposing the top surface.

In some embodiments, the thickness 1310t of the second joint 1310 may have a range of 0.3 mm to 0.8 mm, and the thickness 1110t of the first joint 1110 may have a range of 0.1 mm to 0.5 mm, but is limited thereto. In addition, the thickness 1110t of the first joint 1110 and the thickness 1130t of the plate 1130 of the first support member SP_1 may be the same, which may be a result of the manufacturing process of the display device 1 to be described later.

The third support member SP_3 may support the third area PNL_3 of the display panel PNL. The third support member SP_3 may include a portion of the first support layer 1100 and the second support layer 1300. The third support member SP_3 may include a plurality of first joints 1110 and a plurality of second joints 1310. The first joint 1110 of the third support member SP_3 may be included in the first support layer 1100, and the second joint 1310 thereof may be included in the second support layer 1300. It may be understood that the first joint 1110 and the second joint 1310 of the third support member SP_3 are substantially the same as the first joint 1110 and the second joint 1310 of the second support member SP_2 described above.

Shapes of the second support member SP_2 and the third support member SP_3 in a plan view may have a 'T' shape as the shapes of the first joint 1110 and the second joint 1310 in a plan view are rectangular. Referring to FIGS. 6 and 7, in a comparative example, a second support member SP_2' and a third support member SP_3' may include only the first joint without including the second joint. The first joint, according to the comparative example, may have a trapezoidal shape or a substantially rectangular shape that becomes narrower toward the other side thereof in the third direction DR3. In a slide display device, since the support module SP is deformed while the display panel PNL is changed from the first state to the second state, a lifting phenomenon in which the display panel PNL is lifted in the third direction DR3 may occur. Table 1 below summarizes data on the amount of lifting and joint weight per a size of the display panel of the display device 1 according to the comparative example in which the joint shape has a trapezoidal shape and the embodiment in which the joint shape has a 'T' shape.

TABLE 1

| Size (inch) of Display Panel (PNL) | Joint Shape | Amount of Lifting (mm) | Joint Weight (g) |
| --- | --- | --- | --- |
| 7.2 | Trapezoidal Shape | 0.14 | 0.5 |
|  | T Shape | 0.09 | 0.3 |
| 12.4 | Trapezoidal Shape | 0.79 | 0.9 |
|  | T Shape | 0.48 | 0.5 |
| 17.3 | Trapezoidal Shape | 2.96 | 1.3 |
|  | T Shape | 1.85 | 0.8 |

According to the data in the table, the amount of lifting D of the display panel PNL in the third direction DR3 due to the lifting phenomenon of the display device 1, according to the embodiment, may be smaller than the amount of lifting D' of the display panel PNL due to the lifting phenomenon of the comparative example. For example, it may be seen that in the display device 1, according to an embodiment, the amount of lifting D of the display panel PNL in the third direction DR3 that may occur while the display panel PNL is changed from the first state to the second state is reduced to a ½ level in comparison with the comparative example in which the joint shape has the trapezoidal shape, and the joint weight is less in comparison with the comparative example in which the joint shape has the trapezoidal shape. This may be a result of forming the second support member SP_2 and the third support member SP_3 in the 'T' shape in a plan view. For example, in the display device 1, according to the embodiment, compared to the display device 1, according to the comparative example, having the joint of the trapezoidal shape, the joint weight may be smaller and the amount of lifting D of the display panel PNL in the third direction DR3 may be reduced.

An air gap defined as an empty space surrounded by the bottom surface of the first support member SP_1, the second joint 1310 of the second support member SP_2, and the second joint 1310 of the third support member SP_3 may be formed on a lower side of the first support member SP_1. As the air gap is formed on the lower side of the first support member SP_1, a shock applied to the display panel PNL may be reduced. For example, when an object such as a user's pen falls on the first area PNL_1 of the display panel PNL, the air gap may absorb a shock resulting therefrom. A thickness of the air gap in the third direction DR3 may be substantially the same as the thickness 1310t of the second joint 1310.

The elastic member EM may prevent the first support member SP_1, the second support member SP_2, and the third support member SP_3 from being recognized on the display panel PNL, and to absorb stress that may occur depending on the behavior of the first support member SP_1, the second support member SP_2, and the third support member SP_3 to prevent the stress from affecting the display panel PNL. The elastic member EM may be disposed between the display panel PNL and the support module SP.

One surface of the elastic member EM in the third direction DR3 may be a top surface on which the display panel PNL is disposed, and the other surface of the elastic member EM in the third direction DR3 may be a bottom surface on which the support module SP is disposed. The top surface of the elastic member EM may be attached to the bottom surface of the display panel PNL by a separate adhesive. In addition, the top surface of the elastic member EM and the support module SP may be attached to each other by an adhesive layer ADH interposed between the elastic member EM and the support module SP. In some embodiments, the adhesive layer ADH may be a pressure sensitive adhesive PSA, but is not necessarily limited thereto.

The elastic member EM may be disposed across the first support member SP_1, the second support member SP_2, and the third support member SP_3 in a plan view. The elastic member EM may be continuously disposed regardless of the plurality of first joints 1110 and the spaced spaces between the plurality of first joints 1110 of the second support member SP_2 and the third support member SP_3, and the plurality of second joints 1310 and the spaced spaces between the plurality of second joints 1310 thereof. The elastic member EM may have a shape substantially the same as a shape of the display panel PNL in a plan view. The elastic member EM may overlap an entirety of the display panel PNL in the third direction DR3. When the display panel PNL is bent, the elastic member EM may be bent like the display panel PNL. The elastic member EM may be made of a material having an elastic modulus that permits bending. In some embodiments, the elastic member EM may include polyurethane or the like, but is not necessarily limited thereto.

The panel storage container SD serves to store at least a portion of the display panel PNL and the support module SP. The panel storage container SD may include a first bent portion SD_1 including the first display device bent area RA_1, a second bent portion SD_3 including the second display device bent area RA_2, and a sidewall portion SD_2 connecting the first bent portion SD_1 and the second bent portion SD_3 to each other. A rail may be formed inside the sidewall portion SD_2 to guide a slide operation of the display panel PNL.

Hereinafter, a manufacturing process for manufacturing the display device 1 according to an embodiment will be described.

FIGS. 8 to 22 are cross-sectional views and perspective views for each process for explaining a manufacturing process of manufacturing the display device of FIG. 1.

Referring to FIGS. 8 to 14, a first mask MS1 is formed on both side surfaces of a first material layer 1100" in the third direction DR3, and the first material layer 1100" exposed by the first mask MS1 is etched to form a first bridge layer 1100'. For example, in the process of forming the first mask MS1 on both side surfaces of the first material layer 1100" in the third direction DR3, a photosensitive organic material is coated on both side surfaces of the first material layer 1100" in the third direction DR3, and is exposed and developed, thereby forming the first mask MS1 as a photoresist pattern on both surfaces of the first material layer 1100" in the third direction DR3. In addition, the process of etching the first material layer 1100" exposed by the first mask MS1 may be performed as a wet etch process.

Figure 9:
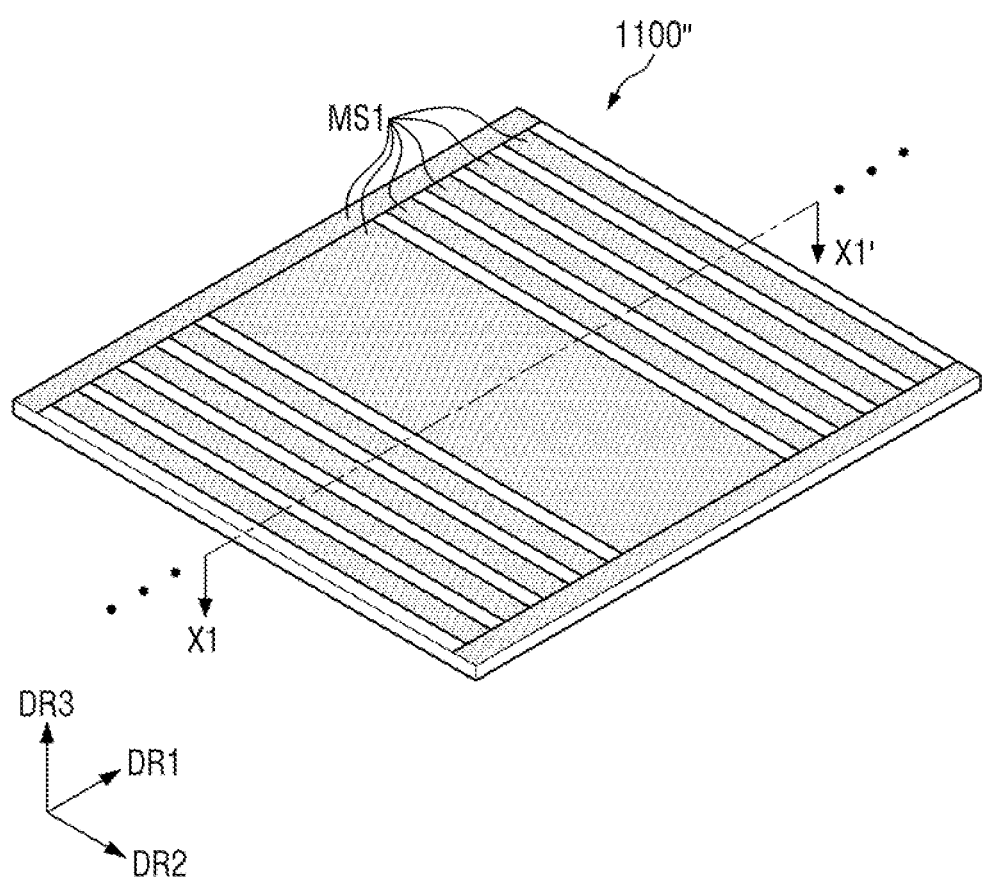
Figure 10:
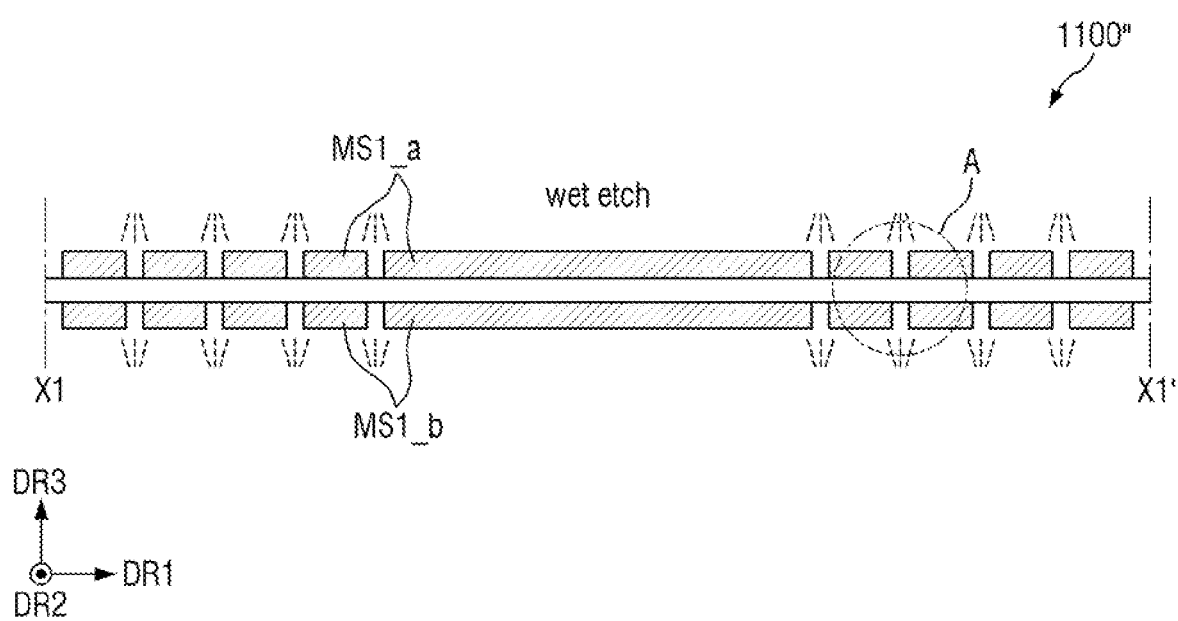

FIG. 10 is a cross-sectional view illustrating a cross-section taken along line X1-X1' of FIG. 9. Referring to FIG. 10, the first material layer 1100" may include substantially the same material as a first bridge layer 1100' and a first support layer 1100, which will be described later. A width (hereinafter, referred to as a 'thickness') of the first material layer 1100" in the third direction DR3 may be substantially the same as the thickness 1100t (see FIG. 4) of the first support layer 1100. For example, the thickness 1110t of the first joint 1110 of the first support layer 1100, the thickness 1130t of the plate 1130, and the thickness of the first material layer 1100" may all be substantially the same.

When the first mask MS1 is formed on both side surfaces of the first material layer 1100" in the third direction DR3, the first mask MS1 may include a first_first mask MS1_a formed on one side surface of the first material layer 1100" in the third direction DR3, and a first_second mask MS1_b formed on the other side surface of the first material layer 1100" in the third direction DR3. Widths of the first_first mask MS1_a and the first_second mask MS1_b in the first direction DR1 may be substantially the same as the width 1110w of the first joint 1110 in the first direction DR1 in an area corresponding to the second support member SP_2, and may be substantially the same as the width of the plate 1130 in the first direction DR1 in an area corresponding to the first support member SP_1. The width of the first material layer 1100" exposed by the first_first mask MS1_a and the first_second mask MS1_b may be substantially the same as the above-described first width 1120 (see FIG. 4). The first_first mask MS1_a and the first_second mask MS1_b may also be disposed on an area for forming a bridge disposed at an edge of the first bridge layer 1100', which will be described later.

The first_first mask MS1_a and the first_second mask MS1_b may completely overlap each other in the third direction DR3. For example, the first_first mask MS1_a and the first_second mask MS1_b may have substantially the same shape. Accordingly, the process of etching the first material layer 1100" may be symmetric etching. For example, the degree to which the first material layer 1100" is etched on opposite sides in the third direction DR3 is the same, and accordingly, the etched surface may have a flat profile.

When the process of etching the first material layer 1100" is performed by wet etching, isotropic etching may occur on the first material layer 1100".

Figure 11:
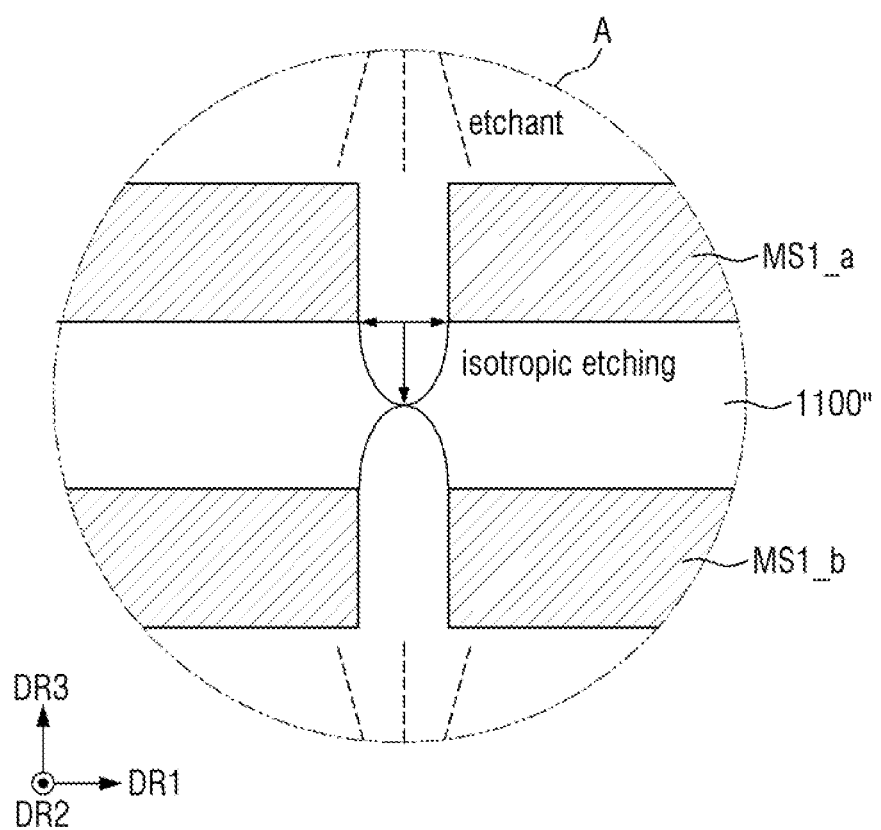

FIG. 11 is an enlarged view of area A of FIG. 10. Referring to FIG. 11, isotropic etching may occur on both side surfaces of the first material layer 1100" exposed by the first mask MS1 in the third direction DR3. Accordingly, as the thickness of the first material layer 1100" increases, the degree of etching of the first material layer 1100" increases, and the first width 1120 (see FIG. 4) may increase. Accordingly, in order to form the first width 1120 within the range of 0.1 mm to 0.5 mm or to be 0.9 mm or less, the thickness of the first material layer 1100" may have a range of 0.1 mm to 0.5 mm.

Figure 12:
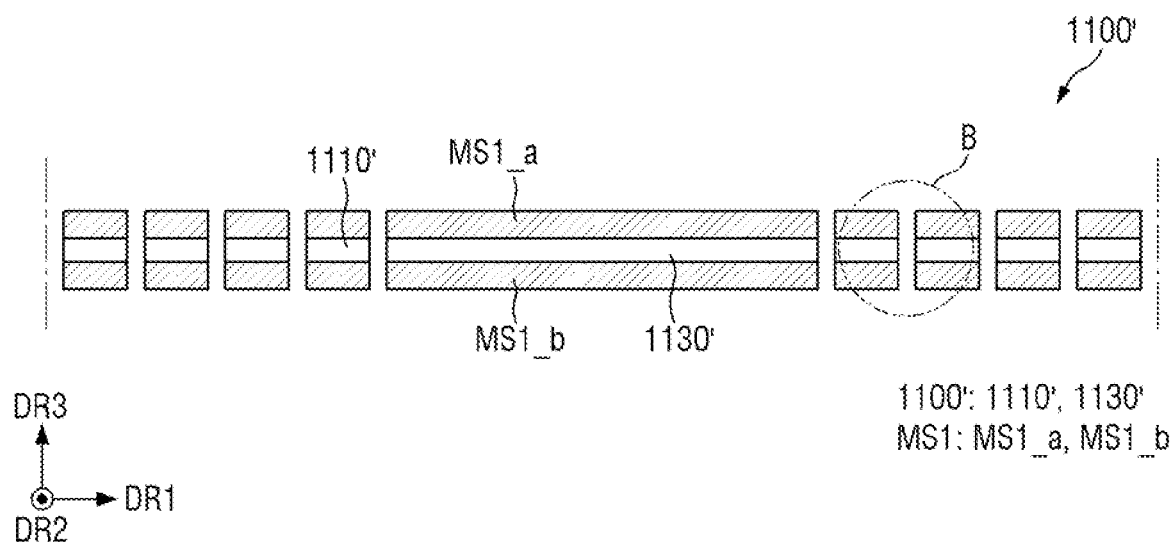
Figure 13:
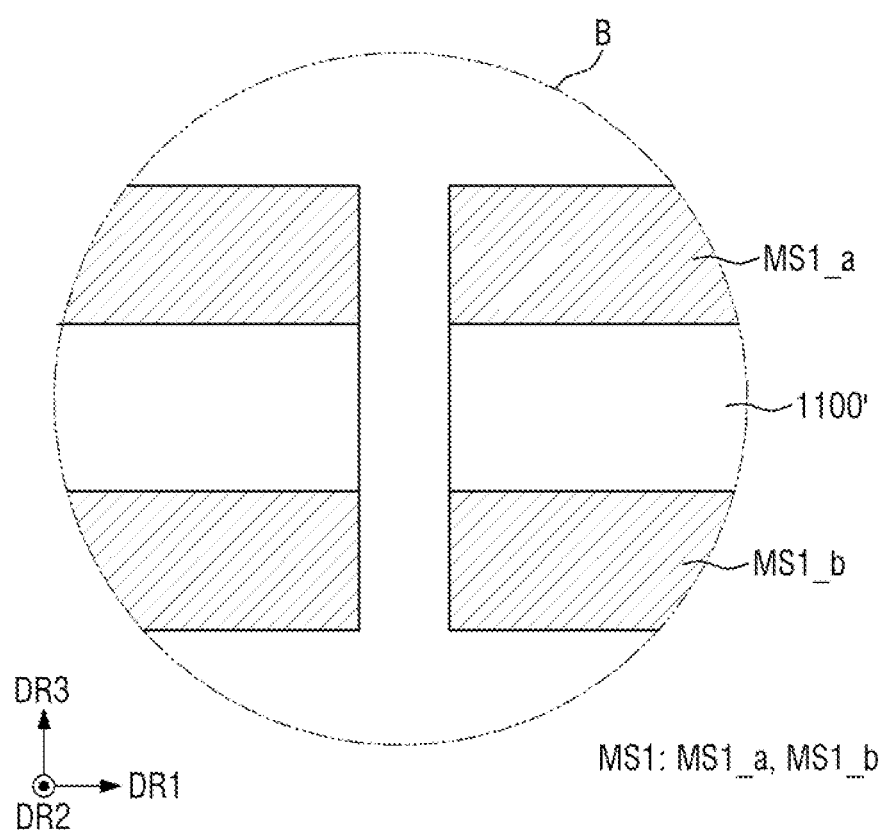
Figure 14:
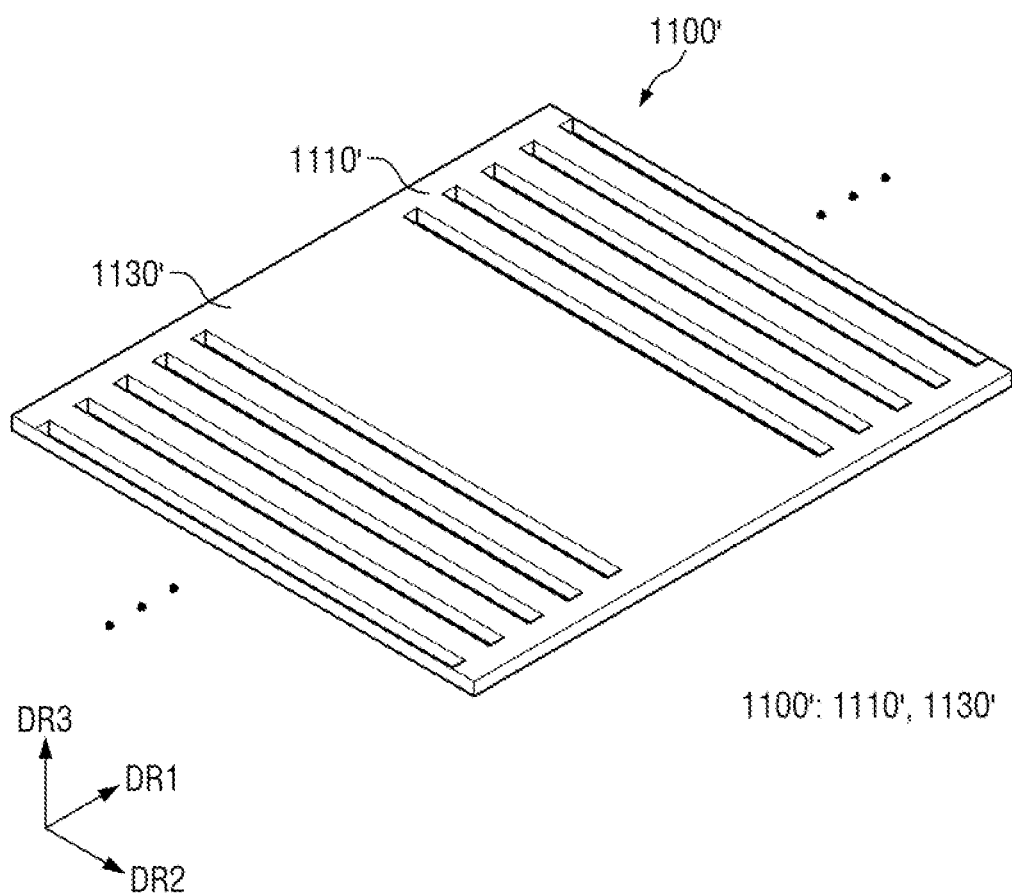

FIG. 13 is an enlarged view of area B of FIG. 12. Referring to FIG. 13, when the symmetric etching and the isotropic etching are performed, the cross-section of the etched first material layer 1100" may have a flat shape. Accordingly, the first joint 1110 and the plate 1130 of the first support layer 1100 may have a rectangular shape in a plan view.

As described above, by wet etching the first material layer 1100", the first width 1120, which is the spaced distance of the first joints 1110, may be reduced to 0.9 mm or less, a processing time may be reduced to increase manufacturing efficiency, and the first joint 1110 and the plate 1130 may be formed at the same time to prevent the recognition (e.g., the ability to see the joining) between the first joint 1110 and the plate 1130.

The first bridge layer 1100' formed by etching the first material layer 1100" exposed by the first mask MS1 may include a first joint bridge layer 1110' and a first plate bridge layer 1130'. The first joint bridge layer 1110' may become the first joint 1110 of the first support layer 1100 through the subsequent processes, and the first plate bridge layer 1130' may become the plate 1130 of the first support layer 1100 through the subsequent processes.

Next, referring to FIGS. 15 to 18, a second mask MS2 is formed on both side surfaces of a second material layer 1300" in the third direction DR3, and the second material layer 1300" exposed by the second mask MS2 is etched to form a second bridge layer 1300'. For example, in the process of forming the second mask MS2 on both side surfaces of the second material layer 1300" in the third direction DR3, a photosensitive organic material is coated on both side surfaces of the second material layer 1300" in the third direction DR3, and is exposed and developed, thereby forming the second mask MS2 as a photoresist pattern on both surfaces of the second material layer 1300" in the third direction DR3. In addition, the process of etching the second material layer 1300" exposed by the second mask MS2 may be performed as a wet etch process.

Figure 15:
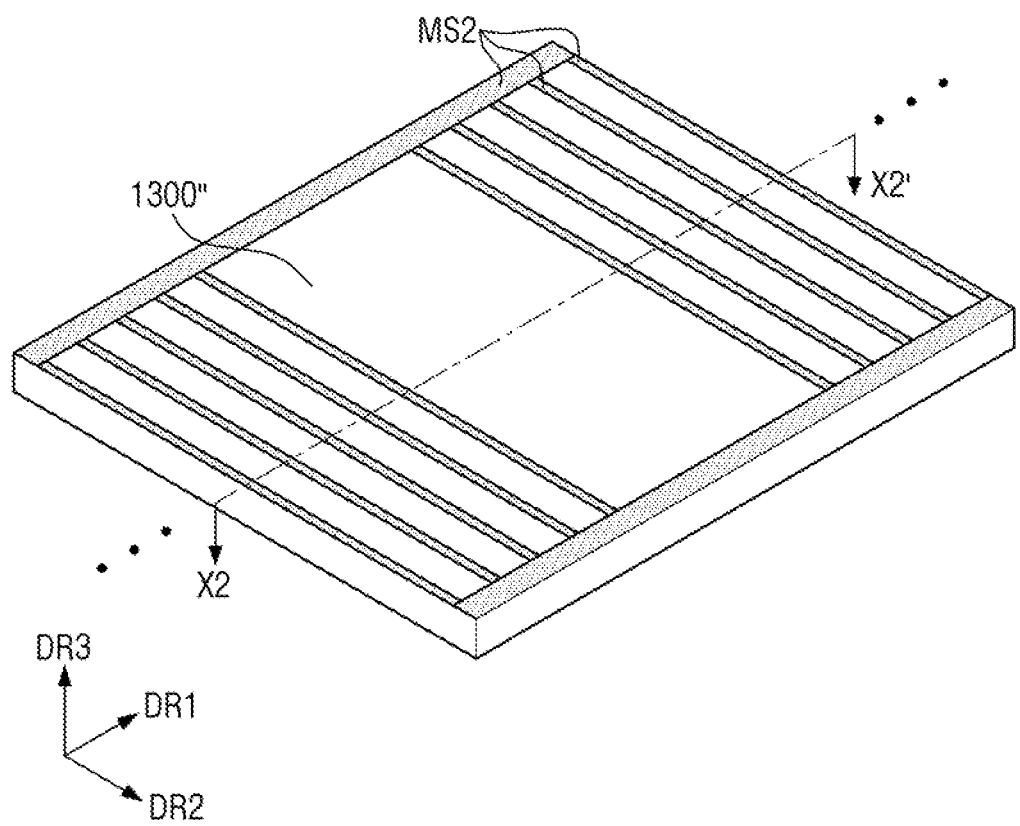
Figure 16:
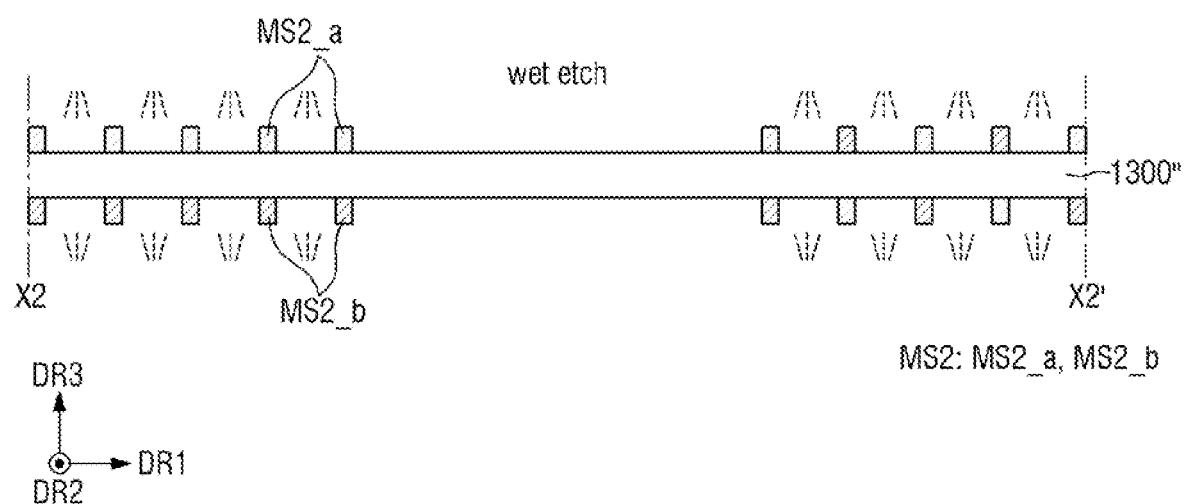
Figure 17:
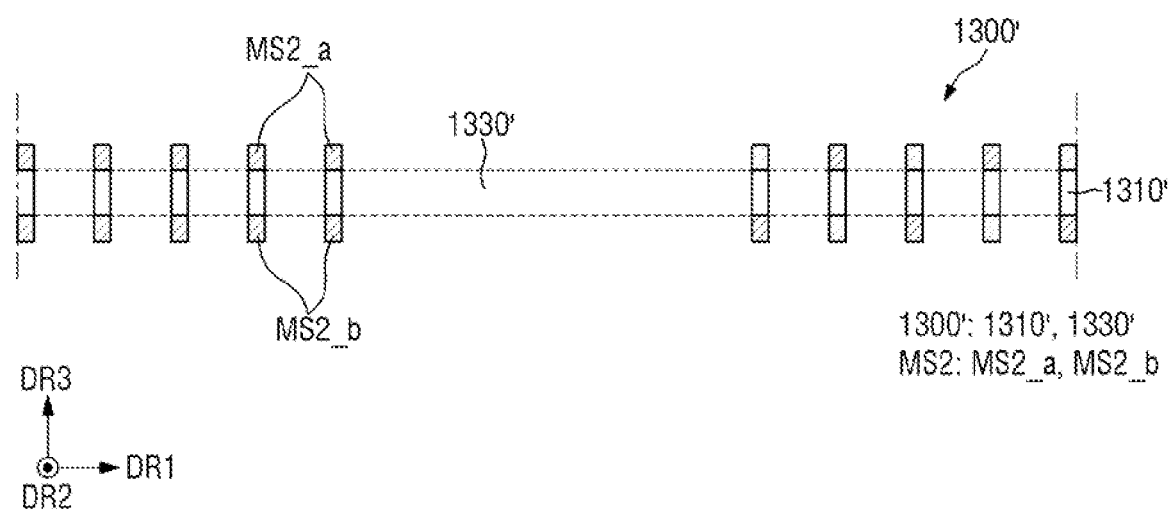
Figure 18:
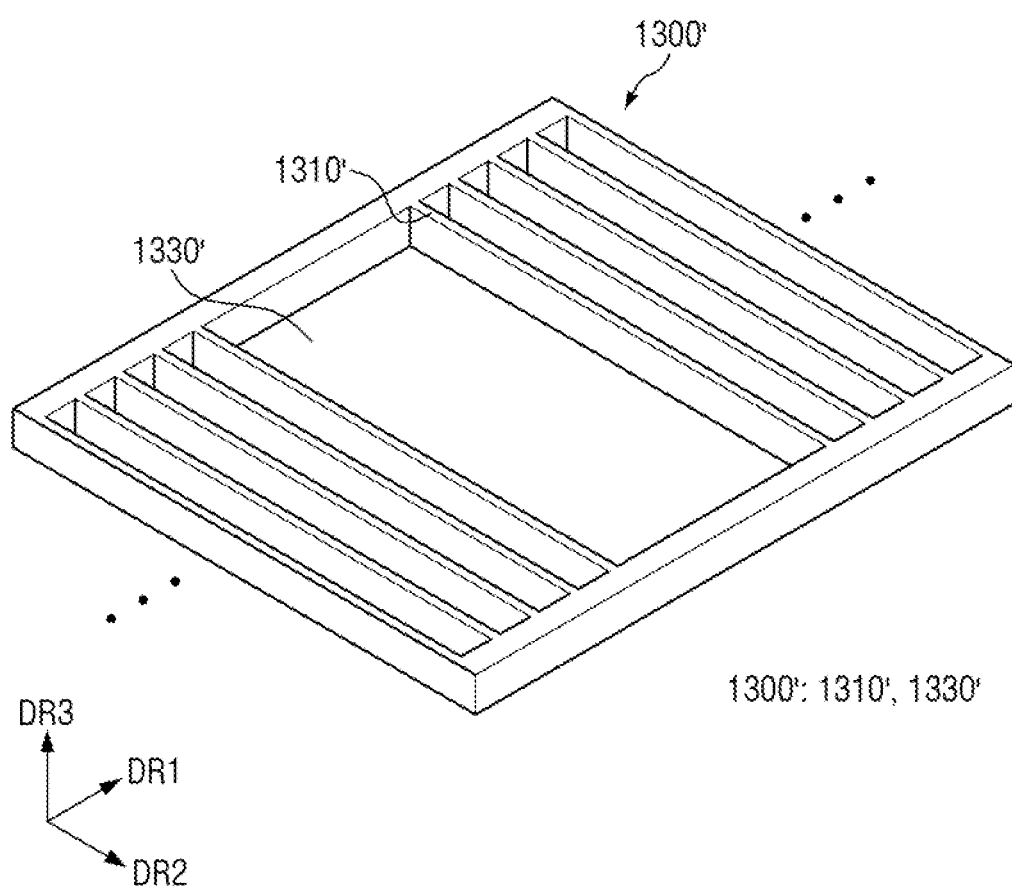
Figure 19:
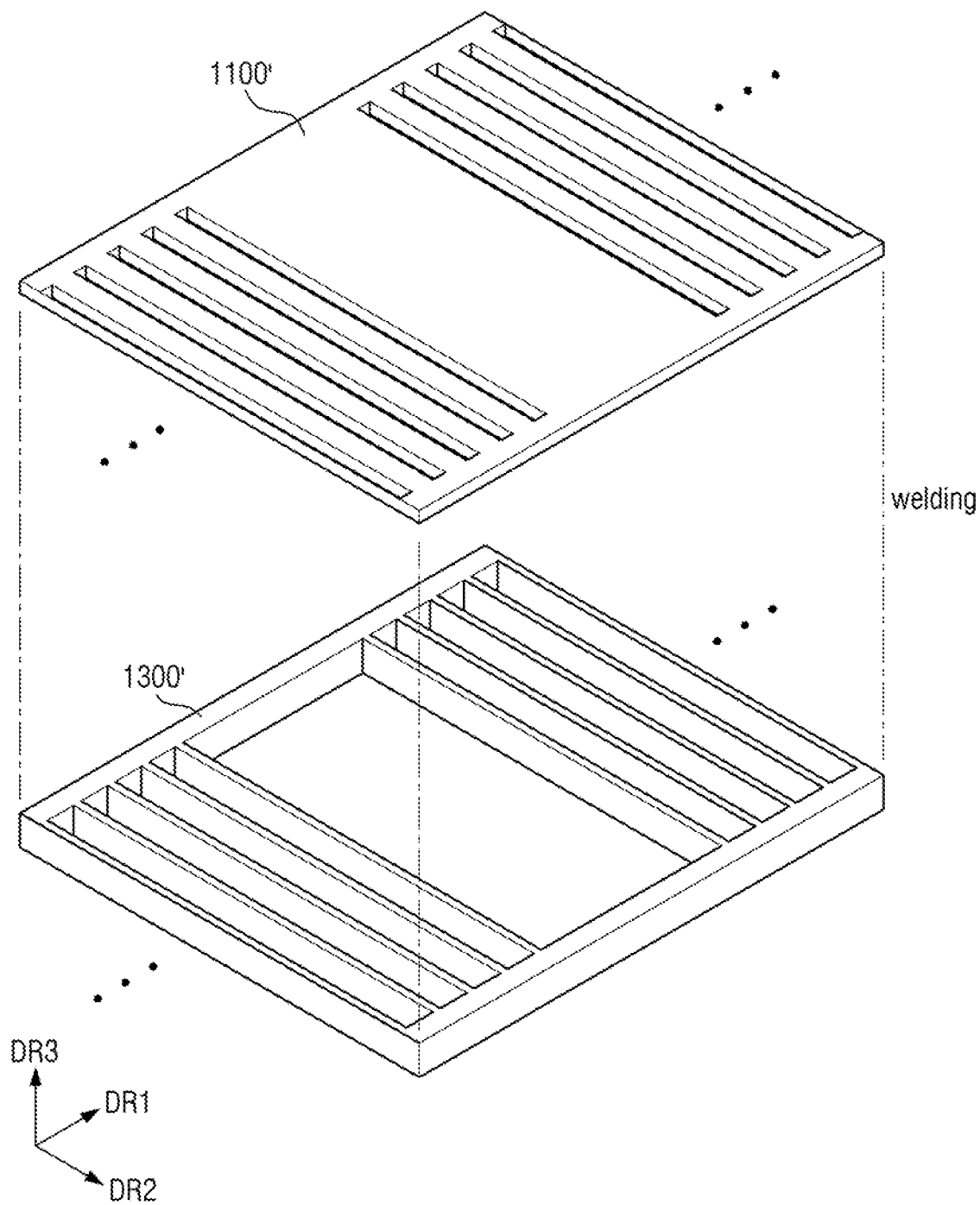
Figure 20:
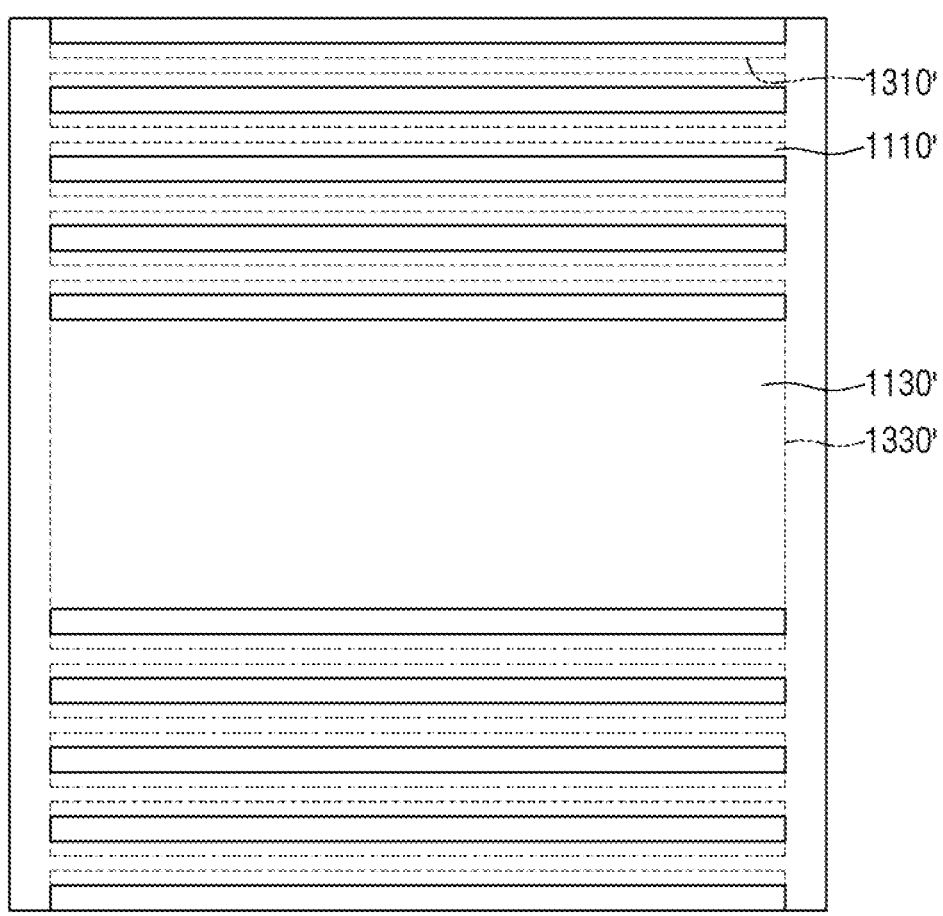
Figure 20:
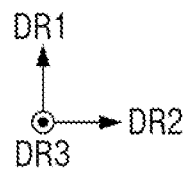

FIG. 16 is a cross-sectional view illustrating a cross-section taken along line X2-X2' of FIG. 15. Referring to FIG. 16, the second material layer 1300" may include substantially the same material as a second bridge layer 1300' and a second support layer 1300, which will be described later. A width (hereinafter, referred to as a 'thickness') of the second material layer 1300" in the third direction DR3 may be substantially the same as the thickness of the second support layer 1300. Accordingly, the thickness of the second material layer 1300" may be greater than the thickness of the first material layer 1100".

When the second mask MS2 is formed on both side surfaces of the second material layer 1300" in the third direction DR3, the second mask MS2 may include a second_first mask MS2_a formed on one side surface of the second material layer 1300" in the third direction DR3, and a second_second mask MS2_b formed on the other side surface of the second material layer 1300" in the third direction DR3. The width of the second material layer 1300" exposed by the second_first mask MS2_a and the second_second mask MS2_b may be substantially the same as the above-described second width 1320 (see FIG. 4). The second_first mask MS2_a and the second_second mask MS2_b may completely overlap each other in the third direction DR3. For example, the second_first mask MS2_a and the second_second mask MS2_b may have substantially the same shape. Accordingly, the process of etching the second material layer 1300" may be performed by symmetric etching, and the second joint 1310 of the second support layer 1300 may have a rectangular shape in a plan view. The second_first mask MS2_a and the second_second mask MS2_b may also be disposed on an area for forming a bridge disposed at an edge of the second bridge layer 1300', which will be described later.

The second bridge layer 1300' formed by etching the second material layer 1300" exposed by the second mask MS2 may include a second joint bridge layer 1310' and an air gap bridge layer 1330'. The second joint bridge layer 1310' may become the second joint 1310 of the second support layer 1300 through the subsequent processes, and the air gap bridge layer 1330' may provide a space for forming an air gap through the subsequent processes. On the other hand, as described in the first material layer 1100", by wet etching the second material layer 1300", the processing time may be reduced to increase manufacturing efficiency.

Next, referring to FIGS. 19 to 22, after aligning and bonding the first bridge layer 1100' and the second bridge layer 1300' to each other and attaching the elastic member EM onto the first bridge layer 1100', edges of the first bridge layer 1100' and the second bridge layer 1300' are cut to remove the bridge, and the first support layer 1100 and the second support layer 1300 are formed. For example, the process of bonding the first bridge layer 1100' and the second bridge layer 1300' to each other may be performed by metal welding.

When the first bridge layer 1100' and the second bridge layer 1300' are aligned, the first joint bridge layer 1110' of the first bridge layer 1100' and the second joint bridge layer 1310' of the second bridge layer 1300' may be aligned to cross each other. Accordingly, the top surface of the second joint 1310 may be bonded to the center of the bottom surface of the first joint 1110.

When the process of bonding the first bridge layer 1100' and the second bridge layer 1300' to each other is performed by metal welding, the first joint 1110 and the second joint 1310 may be integrally formed.

Figure 21:
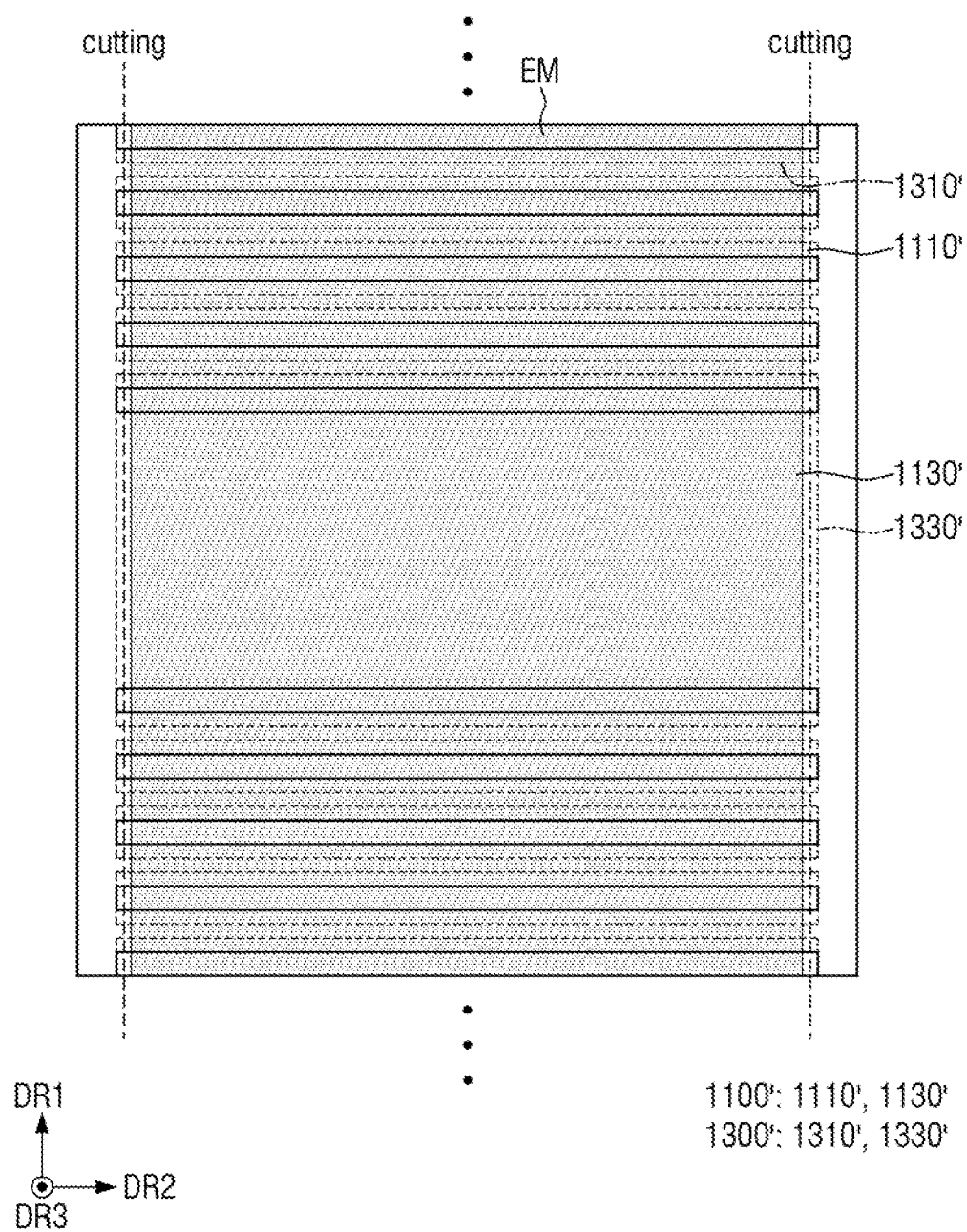
Figure 22:
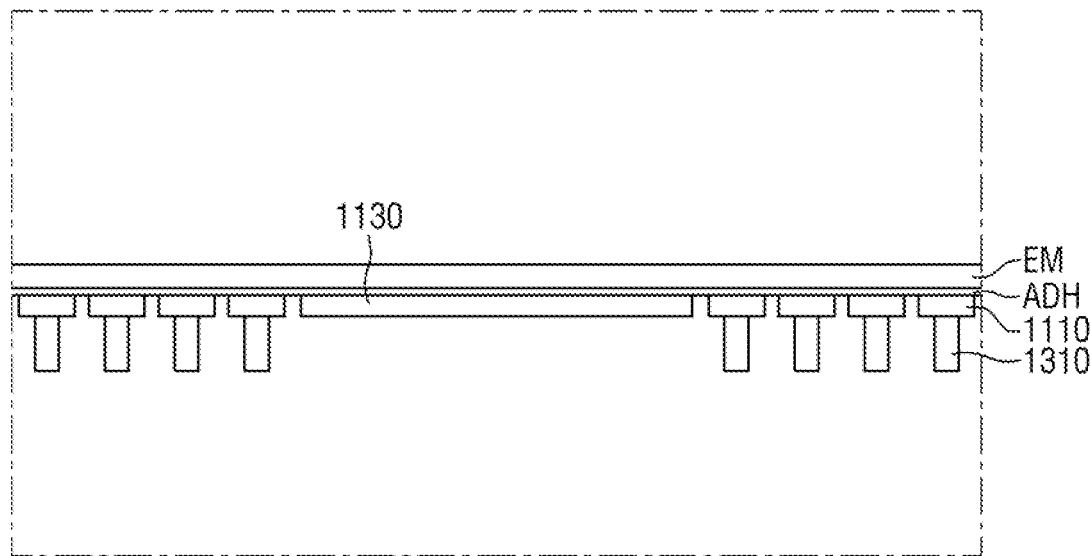
Figure 22:
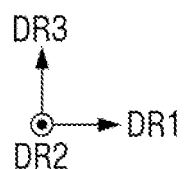

When the edges of the first bridge layer 1100' and the second bridge layer 1300' are cut as illustrated in FIG. 21 after the elastic member EM is attached onto the first bridge layer 1100', the elastic member EM may be disposed inside the edges where the first bridge layer 1100' and the second bridge layer 1300' are cut, and might not be cut together with the edges of the first bridge layer 1100' and the second bridge layer 1300' when the edges of the first bridge layer 1100' and the second bridge layer 1300' are cut.

Thereafter, when a process of attaching the display panel PNL onto the elastic member EM is performed, the display device 1 as illustrated in FIG. 4 is manufactured.

Figure 23:
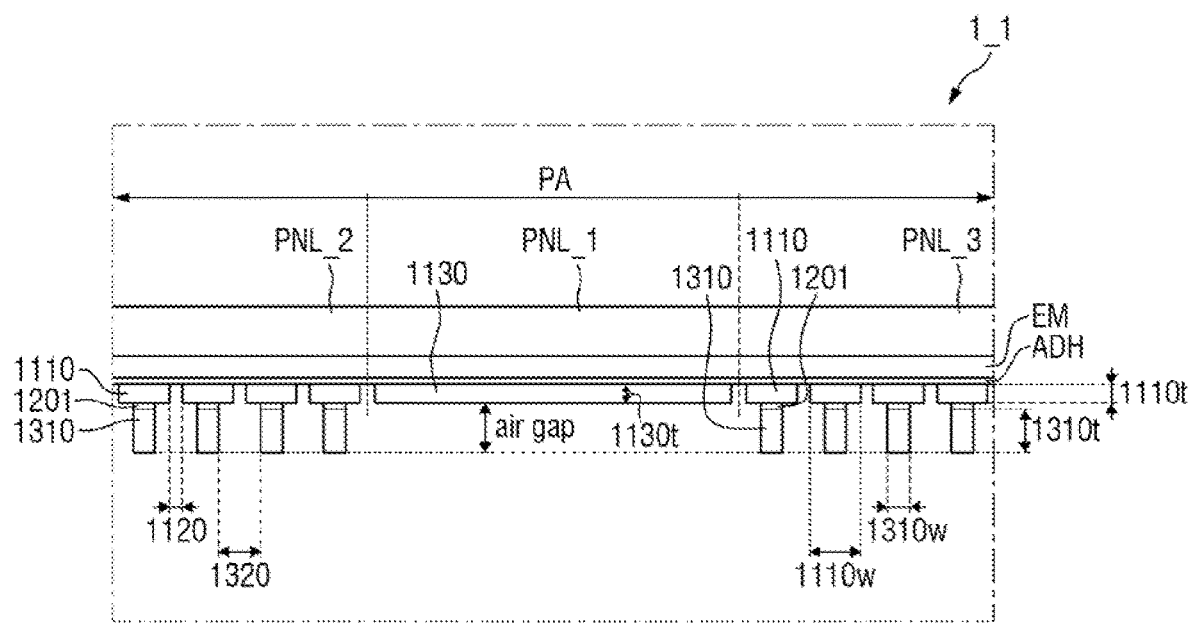
FIG. 23 is a cross-sectional view illustrating a stacked structure of a display panel and a support module of a display device according to an embodiment.

FIG. 23 is a cross-sectional view illustrating a stacked structure of a display panel and a support module of a display device according to an embodiment.

Referring to FIG. 23, it is illustrated that a second support member SP1_2 and a third support member SP1_3 of a display device 1_1, according to the present embodiment, may further include first joints 1110, second joints 1310, and first joint adhesive layers 1201 disposed between the first joints 1110 and the second joints 1310. For example, a width of the first joint adhesive layer 1201 in the first direction DR1 may be substantially the same as a width 1310w of the second joint 1310 in the second direction DR2, and may completely overlap the second joint 1310 in the third direction DR3.

The first joint adhesive layer 1201 may bond the first joint 1110 and the second joint 1310 to each other. In some embodiments, the first joint adhesive layer 1201 may include an optical clear adhesive (OCA) or a thermal curing tape, but is not necessarily limited thereto. The first joint adhesive layer 1201 may have an adhesive force such that the first joint 1110 and the second joint 1310 do not separate from each other even when the display device 1_1 slides. In some embodiments, the adhesive force of the first joint adhesive layer 1201 may be 1800 gf/25 mm or more at room temperature, but is not necessarily limited thereto.

Figure 24:
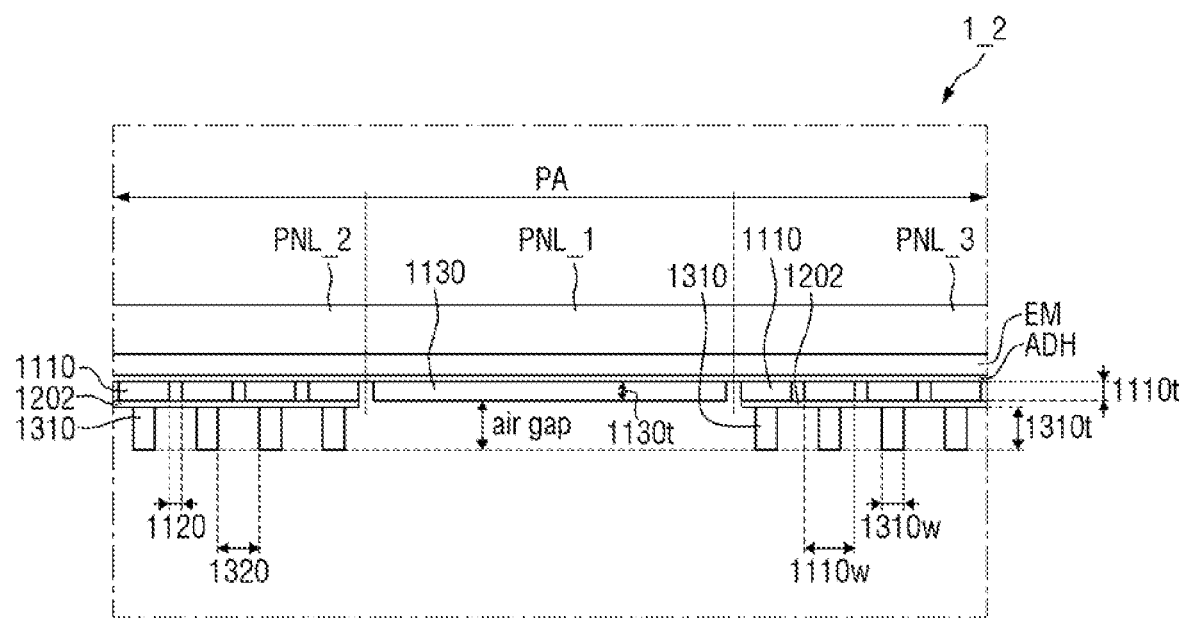
FIG. 24 is a cross-sectional view illustrating a stacked structure of a display panel and a support module of a display device according to an embodiment.
Figure 25:
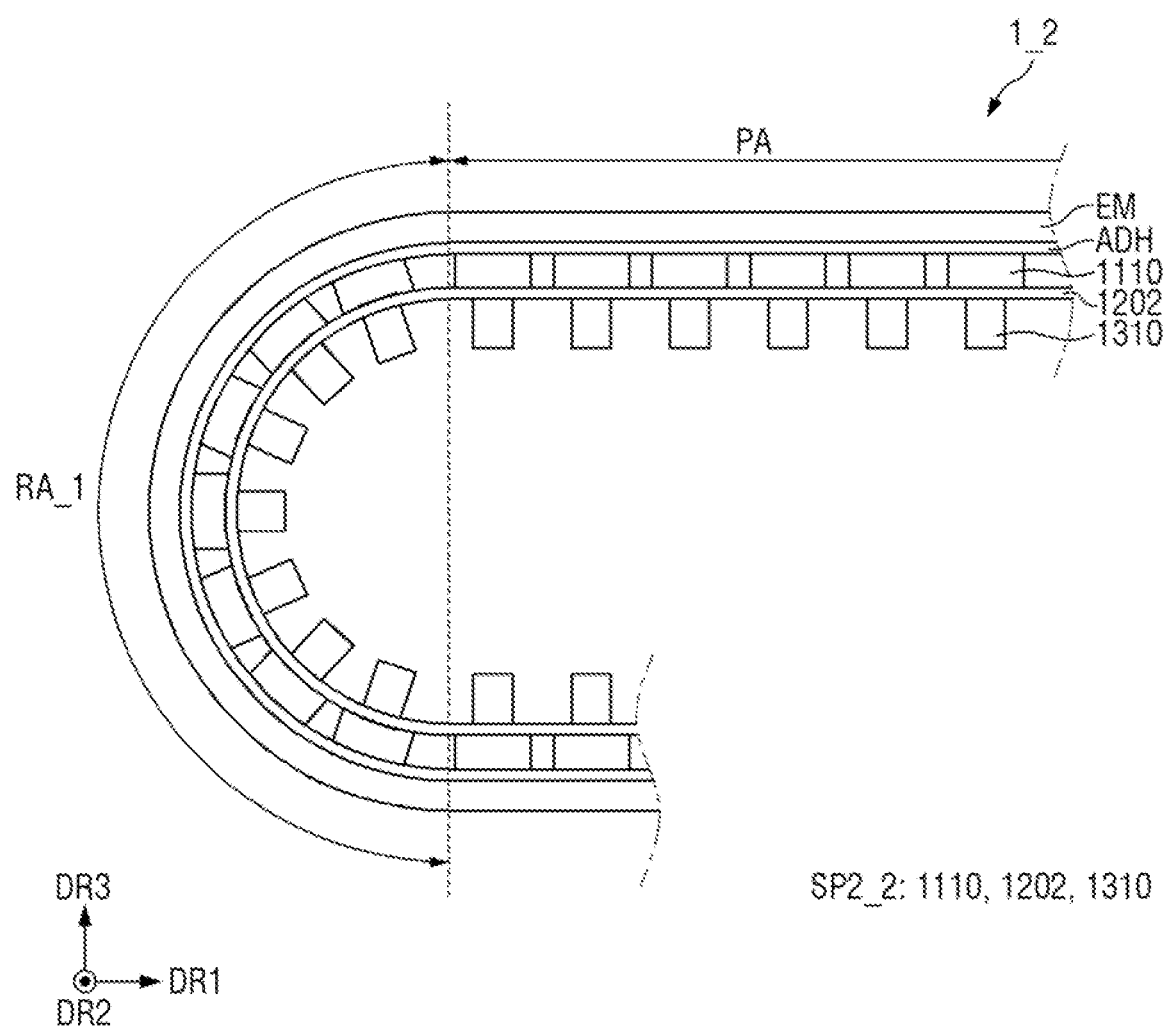
FIG. 25 is a cross-sectional view illustrating a behavior of the support module in a display device bent area of the display device according to the embodiment of FIG. 24.
Figure 26:
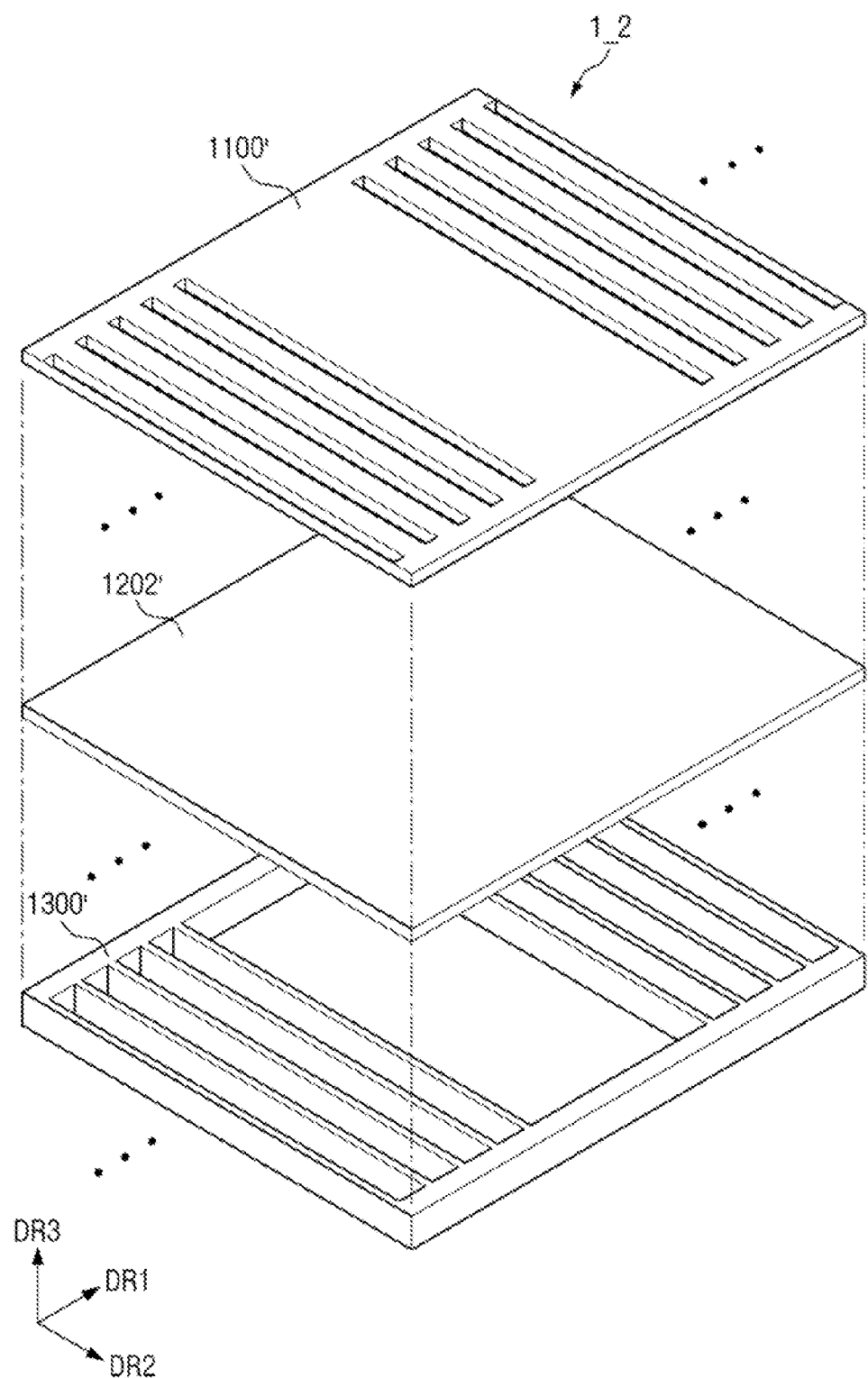
FIG. 26 is a perspective view for explaining a part of a process of manufacturing the display device of FIG. 24.
Figure 27:
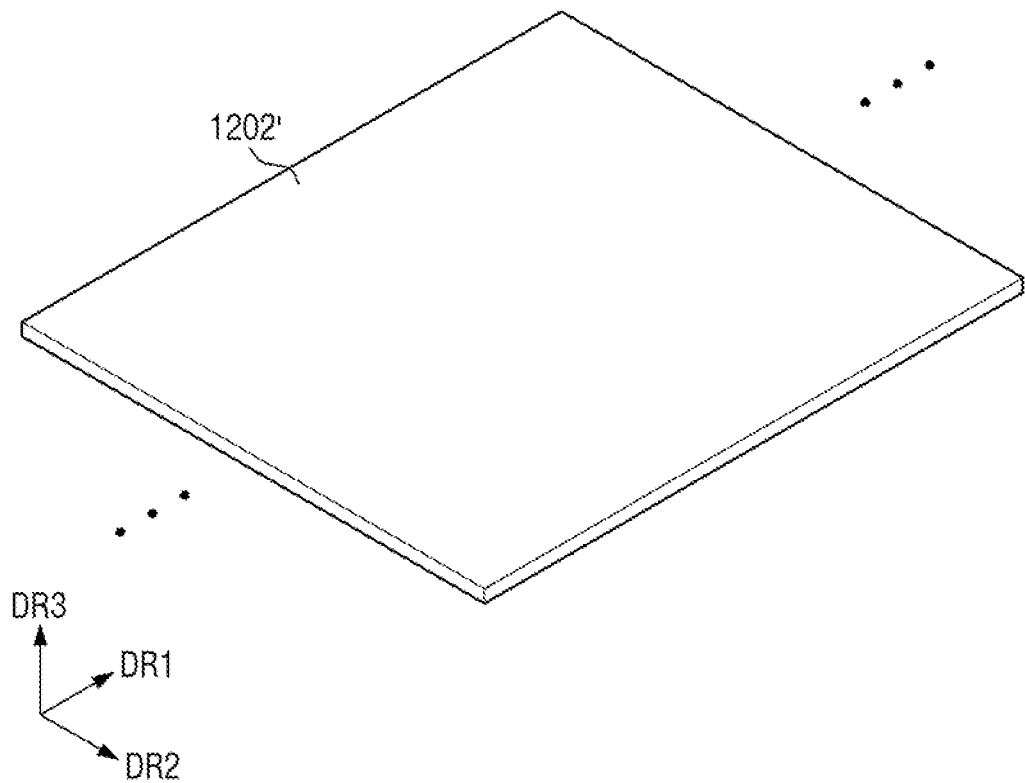
FIGS. 27 and 28 are perspective views illustrating a first joint adhesive layer according to FIG. 24.
Figure 28:
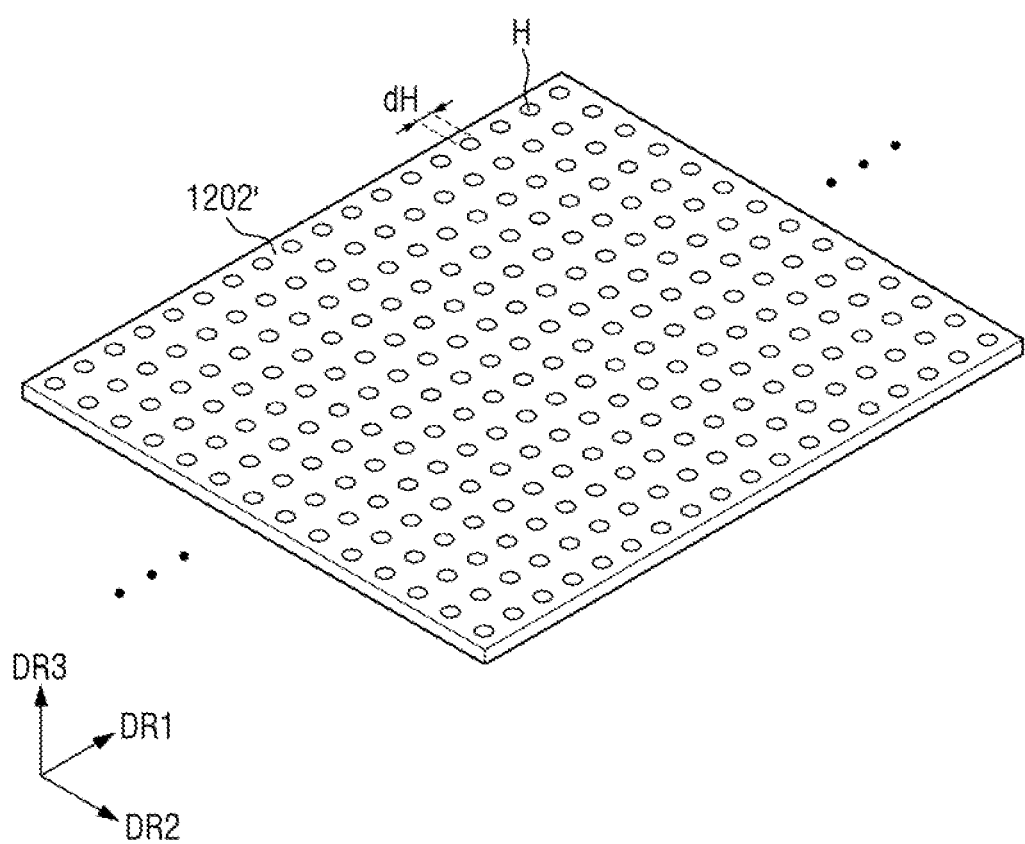

FIG. 24 is a cross-sectional view illustrating a stacked structure of a display panel and a support module of a display device according to an embodiment. FIG. 25 is a cross-sectional view illustrating a behavior of the support module in a display device bent area of the display device according to the embodiment of FIG. 24. FIG. 26 is a perspective view of a partial process for explaining a process of manufacturing the display device of FIG. 24. FIGS. 27 and 28 are perspective views illustrating a joint adhesive film according to FIG. 24.

Referring to FIGS. 24 to 28, a display device 1_2, according to the present embodiment, is different from the display device 1_1 according to the embodiment of FIG. 23 in that the first joint adhesive layer 1201 of the second support member SP2_2 and the third support member SP2_3 is changed to a joint adhesive film 1202. The joint adhesive film 1202 may be integrally formed to penetrate between the plurality of first joints 1110 and the plurality of second joints 1310 and may extend in the first direction DR1. In some embodiments, the joint adhesive film 1202 may have substantially the same shape in a plan view as that of the second area PNL_2 and the third area PNL_3 of the display panel PNL in a plan view, but is not necessarily limited thereto. For example, the joint adhesive film 1202 may have substantially the same shape in a plan view as that of the entirety of the display panel PNL in a plan view.

The joint adhesive film 1202 may bond the plurality of first joints 1110 and the plurality of second joints 1310 to each other, to prevent foreign substances from being introduced between the plurality of first joints 1110, and to prevent deterioration of bent properties due to local interference between the plurality of joints in the bent area. Referring to FIG. 25, since the joint adhesive film 1202 is integrally formed and penetrates through the plurality of first joints 1110 and the plurality of second joints 1310 of the second support member SP2_2 and the third support member SP2_3, a spaced space between the first joints 1110 adjacent to each other might not be exposed. Accordingly, since various foreign substances that may occur as the plurality of joints 1110 and 1310 operate in the bent area are not exposed to the spaced space between the first joints 1110, and the plurality of joints 1110 and 1310 are connected to each other by the joint adhesive film 1202, it is possible to prevent deterioration of bent properties such as twisting of joints due to local interference between the joints.

Referring to FIG. 26, the manufacturing of the display device 1_2 according to the embodiment of FIG. 24 may be performed by disposing a joint adhesive material layer between the first bridge layer 1100' and the second bridge layer 1300'. The joint adhesive material layer may be partially cut in the subsequent process of cutting the edges of the first bridge layer 1100' and the second bridge layer 1300' to form the joint adhesive film 1202.

The joint adhesive film 1202 may have a plate shape including a metal, a polymer film, a thermosetting adhesive layer (ADH), and the like, as illustrated in FIG. 27. For example, when the joint adhesive film 1202 includes the metal, the joint adhesive film 1202 may be a metal plate having a thickness of 40 μm or less to enable sliding and bending. When the joint adhesive film 1202 includes the polymer film, the joint adhesive film 1202 may have an elastic modulus of 4 GPa or more to enable sliding and bending.

As illustrated in FIG. 28, the joint adhesive film 1202 may include a metal, a polymer film, and the like, and may have a mesh-type film shape including fine holes H. In this case, a diameter dH of the fine hole H may be smaller than the width of the foreign substance. For example, since a size of the foreign substance that is introduced between the first joints 1110 and may damage the display panel PNL has a diameter of 300 μm or more, the diameter dH of the fine hole H may be 300 μm or less. A plurality of fine holes H are formed as a whole on the joint adhesive film 1202, so that the joints 1110 and 1310 may be more easily bent.

Figure 29:
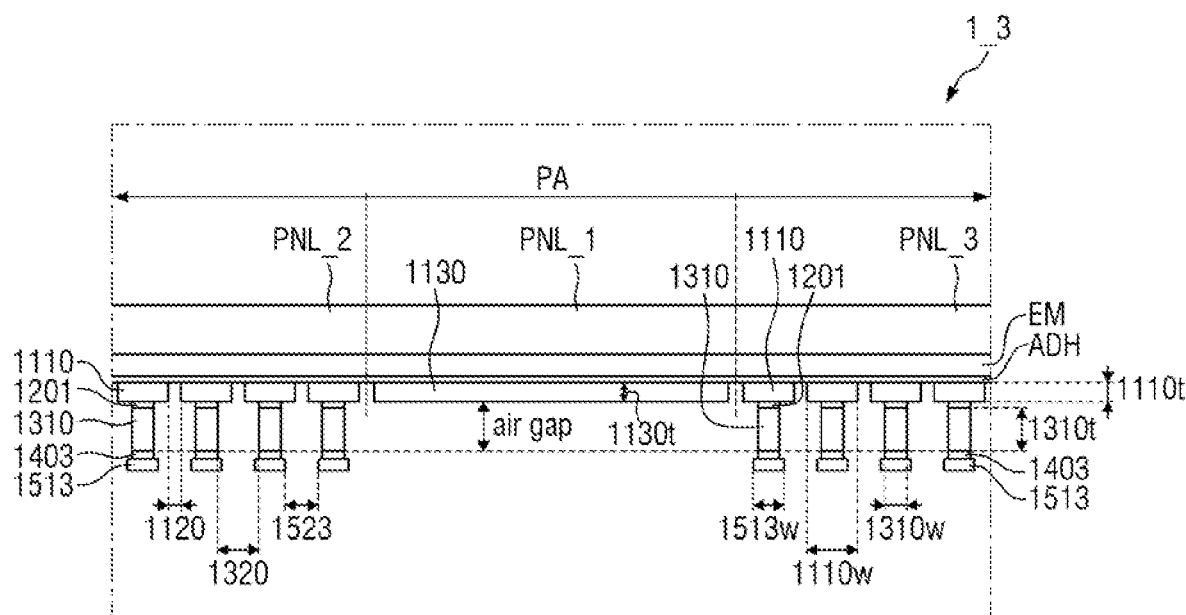
FIG. 29 is a cross-sectional view illustrating a stacked structure of a display panel and a support module of a display device according to an embodiment.

FIG. 29 is a cross-sectional view illustrating a stacked structure of a display panel and a support module of a display device according to an embodiment.

Referring to FIG. 29, it is illustrated that a second support member SP3_2 and a third support member SP3_3 of a display device 1_3, according to the present embodiment, may include the first joints 1110, the first joint adhesive layers 1201, the second joints 1310, the second joint adhesive layers 1403, and third joints 1513. For example, the support module SP3, according to the present embodiment, may further include a third support layer 1503 in addition to the first support layer 1100 and the second support layer 1300.

The third support layer 1503 may include a third joint 1513 disposed on a lower side of the second joint 1310. Like the first support layer 1100 and the second support layer 1300, the third support layer 1503 may be made of a metal such as a stainless steel alloy, for example, SUS304, but is not necessarily limited thereto.

The second support member SP_2 and the third support member SP_3 may further include the third joint 1513. The third joint 1513 may reduce the amount of lifting of the display panel PNL described with reference to FIGS. 6 and 7. A width 1513$w$ of the third joint 1513 in the first direction DR1 may be greater than the width 1310$w$ of the second joint 1310 in the first direction DR1, and may be smaller than the width 1110$w$ of the first joint 1110 in the first direction DR1. The third joint 1513 may have a rectangular shape in a plan view. Accordingly, the second support member SP3_2 and the third support member SP3_3 may have an 'I' shape in a plan view. The amount of lifting of the display panel PNL of the display device 1_3 according to the present embodiment in the third direction DR3 that may occur while the display panel PNL is changed from the first state to the second state may be smaller than the amount of lifting D' according to the comparative example of FIG. 6. Table 2 below summarizes data on the amount of lifting and joint weight per a size of display panel of the display device 1_3 according to the comparative example in which the joint shape has a trapezoidal shape and the present embodiment in which the joint shape has an 'I' shape.

TABLE 2

| Size (inch) of Display Panel (PNL) | Joint Shape | Amount of Lifting (mm) | Joint Weight (g) |
|---|---|---|---|
| 7.2 | Trapezoidal Shape | 0.14 | 0.5 |
|  | I Shape | 0.05 | 0.4 |
| 12.4 | Trapezoidal Shape | 0.79 | 0.9 |
|  | I Shape | 0.30 | 0.7 |
| 17.3 | Trapezoidal Shape | 2.96 | 1.3 |
|  | I Shape | 1.13 | 1.0 |

According to the data in the table above, it may be seen that the amount of lifting of the display panel PNL in the third direction DR3 that may occur while the display panel PNL is changed from the first state to the second state is reduced to a ½ or less in comparison with the comparative example in which the joint shape has the trapezoidal shape, and the joint weight is less in comparison with the comparative example in which the joint shape has the trapezoidal shape. This may be a result of forming the second support member SP3_2 and the third support member SP3_3 in the 'I' shape in a plan view. Accordingly, in the display device 1_3, according to the present embodiment, compared to the display device, according to the comparative example having the joint of the trapezoidal shape, the joint weight may be smaller and the amount of lifting of the display panel PNL in the third direction DR3 may be reduced.

An adhesive layer may be interposed between the first joint 1110 and the second joint 1310 and between the second joint 1310 and the third joint 1513, respectively. For example, a first joint adhesive layer 1201 may be interposed between the first joint 1110 and the second joint 1310, and a second joint adhesive layer 1403 may be interposed between the second joint 1310 and the third joint 1513, but the disclosure is not necessarily limited thereto. For example, the first joint adhesive layer 1201 may be omitted between the first joint 1110 and the second joint 1310, and the second joint adhesive layer 1403 may also be omitted between the second joint 1310 and the third joint 1513. The first joint adhesive layer 1201 and the second joint adhesive layer 1403 may be substantially the same as each other. Therefore, the detailed description of the second joint adhesive layer 1403 may be understood to be the same as the detailed description of the first joint adhesive layer 1201, provided above.

Figure 30:
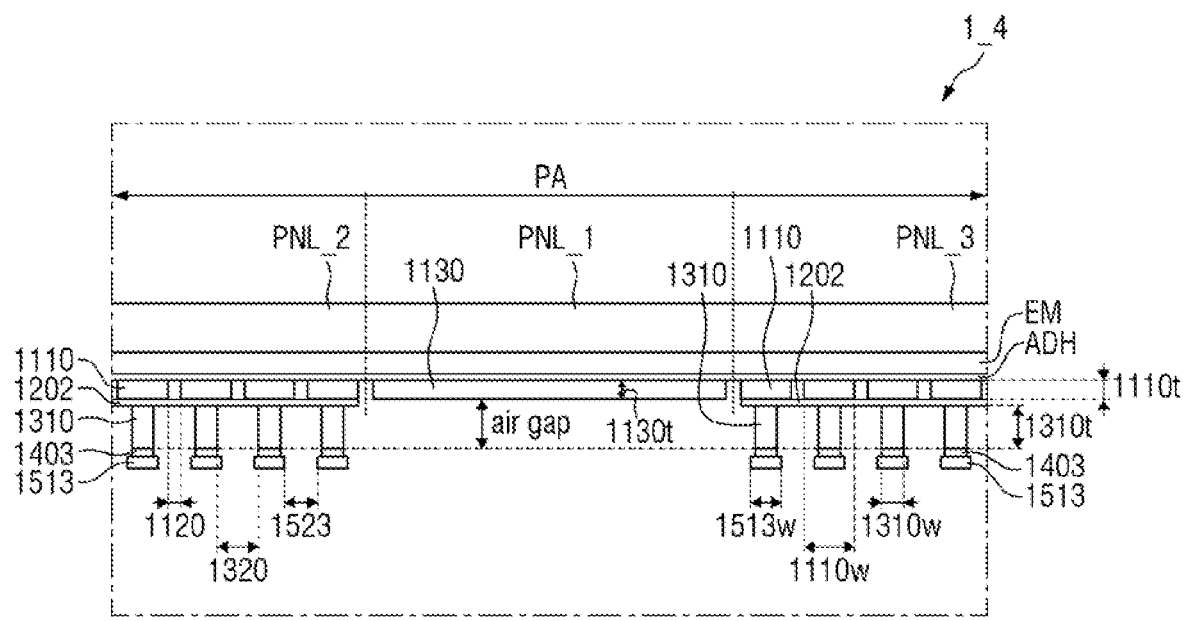
FIG. 30 is a cross-sectional view illustrating a stacked structure of a display panel and a support module of a display device according to an embodiment.

FIG. 30 is a cross-sectional view illustrating a stacked structure of a display panel and a support module of a display device according to an embodiment.

Referring to FIG. 30, a display device 1_4, according to the present embodiment, is different from the display device 1_3, according to the embodiment of FIG. 29, in that a second support member SP4_2 and a third support member SP4_3 include a joint adhesive film 1202 disposed between the plurality of first joints 1110 and the plurality of second joints 1310, and other configurations are substantially the same or similar.

Figure 31:
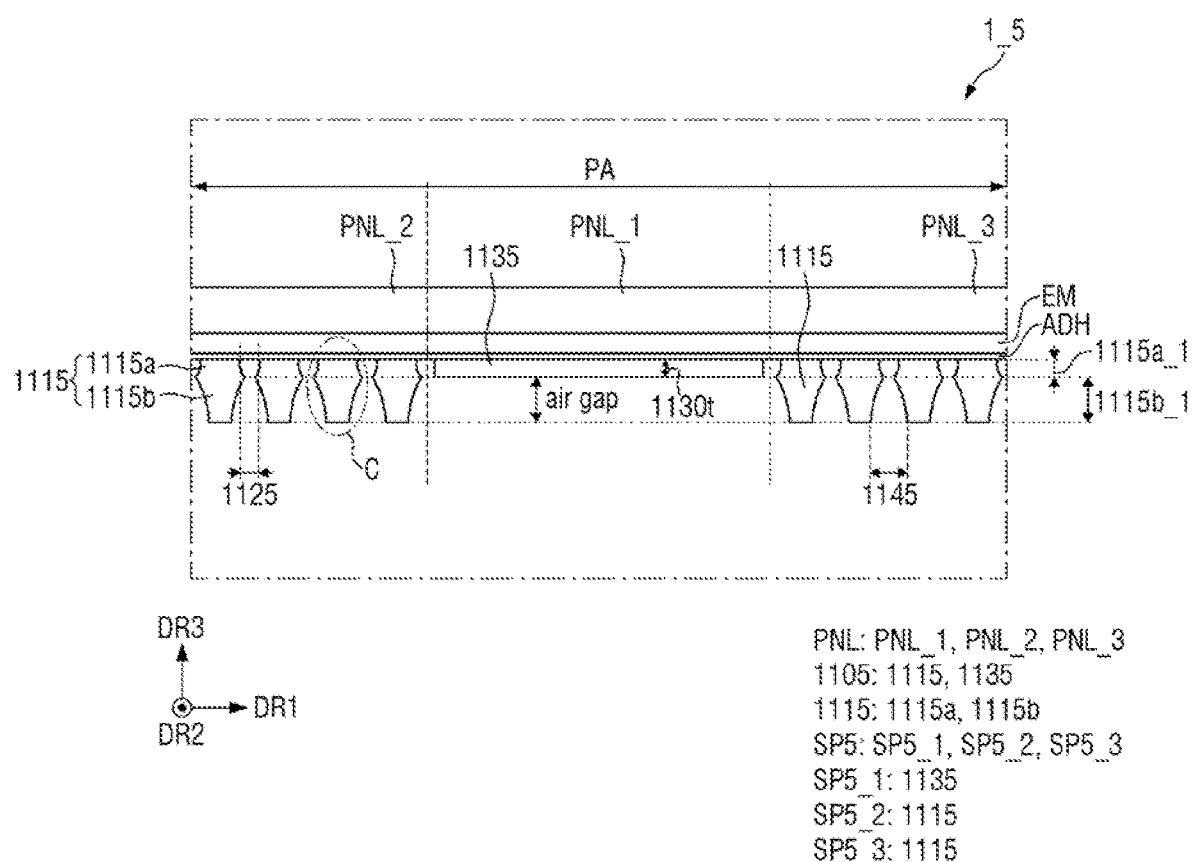
FIG. 31 is a cross-sectional view illustrating a stacked structure of a display panel and a support module of a display device according to an embodiment.
Figure 32:
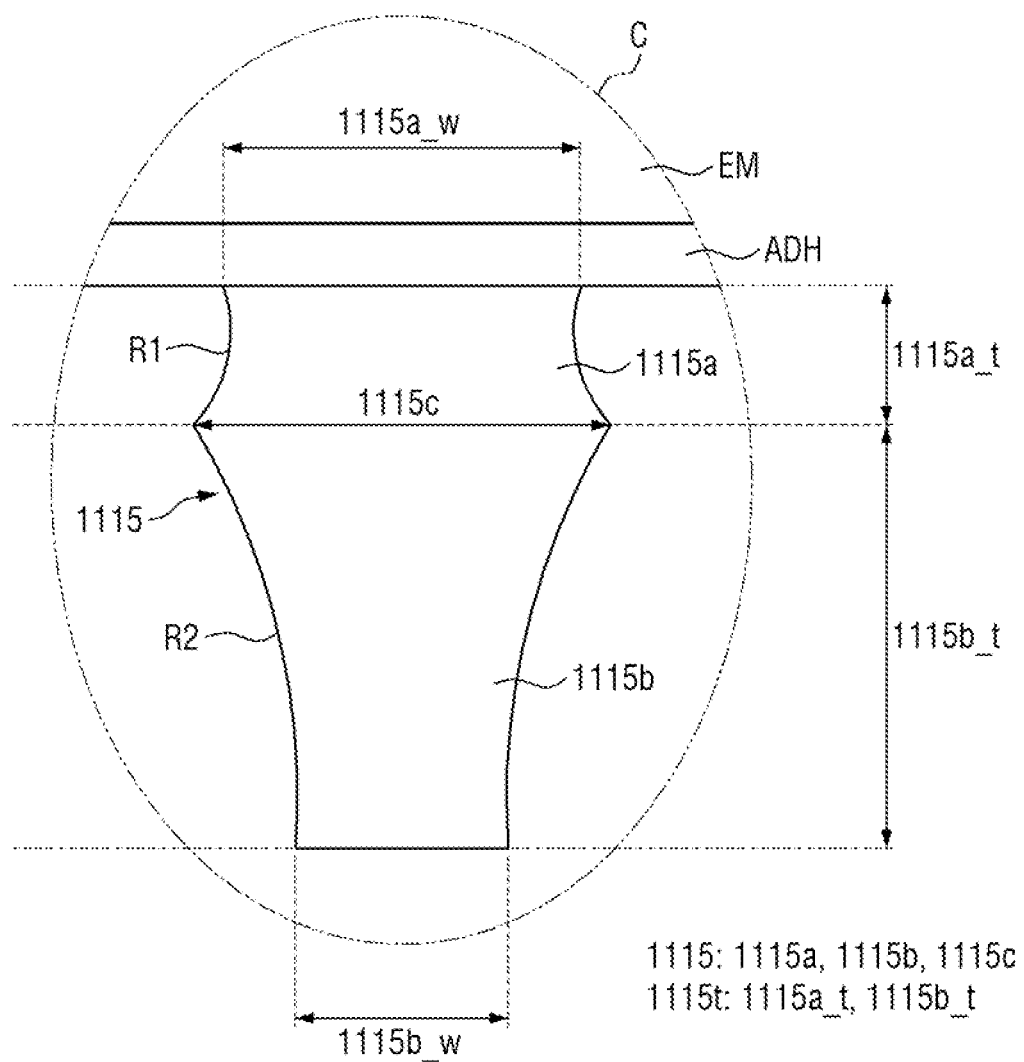
FIG. 32 is an enlarged view of area C of FIG. 31.

FIG. 31 is a cross-sectional view illustrating a stacked structure of a display panel and a support module of a display device according to an embodiment. FIG. 32 is an enlarged view of area C of FIG. 31.

Referring to FIGS. 31 and 32, it is illustrated that a second support member SP5_2 and a third support member SP5_3 of a display device 1_5, according to the present embodiment, may have a tapered shape in which a width in the first direction DR1 decreases toward the other side in the third direction DR3 while having a curvature. For example, a support module SP5 according to the present embodiment may be formed of only a first support layer 1105, and the second support member SP5_2 and the third support member SP5_3 may include a first curvature portion 1115a and a second curvature portion 1115b.

The support module SP5, according to the present embodiment, is formed of only the first support layer 1105, and accordingly, the first support member SP5_1, the second support member SP5_2, and the third support member SP5_3 may be formed from a first material layer 1105" according to a manufacturing process of the display device 1_5 to be described later.

The first support member SP5_1 may include a plate 1135 of the first support layer 1105. The plate 1135 may be understood to be substantially the same as the plate 1130 according to the embodiment of FIG. 4.

The second support member SP5_2 and the third support member SP5_3 may include a first joint 1115. A width of the first joint 1115 in the first direction DR1 may vary in the third direction DR3. The first joint 1115 may include a first curvature portion 1115a having a first curvature R1 and a second curvature portion 1115b having a second curvature R2. The second curvature portion 1115b may be disposed on a lower side of the first curvature portion 1115a. A joint protrusion portion 1115c having a maximum width of the first joint 1110 in the first direction DR1 may be formed at a boundary between the first curvature portion 1115a and the second curvature portion 1115b. A thickness 1115t of the first joint 1115 may be defined as a sum of a thickness 1115a_t of the first curvature portion 1115a and a thickness 1115b_t of the second curvature portion 1115b. A width (hereinafter, referred to as a 'thickness' 1130t) of the plate 1130 in the third direction DR3 may be smaller than a thickness 1115b_t of the second curvature portion 1115b. Accordingly, an air gap may be formed on a lower side of the plate 1130.

The first joint 1115 may be spaced apart from the adjacent first joint 1115 by a first width 1125 in the first direction DR1 based on a surface where the first curvature portion 1115a is attached to the adhesive layer ADH. In addition, the first joint 1115 may be spaced apart from the adjacent first joint 1115 by a second width 1145 in the first direction DR1 based on an end surface of the other side of the second curvature portion 1115b in the third direction DR3. The first width 1125 may be smaller than the second width 1145. In some embodiments, the first width 1125 may have a range of 0.1 mm to 0.5 mm, but is not necessarily limited thereto. For example, the first width 1125 may be 0.9 mm or less. Accordingly, recognition of the joint may be prevented by reducing a spaced distance of the first joint 1115 adjacent to the display panel PNL, for example, the first width 1125, bending interference may be prevented by increasing the thickness of the second curvature portion 1115b and making the spaced distance, for example, the second width 1145, relatively wide, and a lifting phenomenon of the display panel PNL may be alleviated by increasing the rigidity of the first joint 1115 itself.

The first curvature portion 1115a may have a first curvature R1 which is concave into the first joint 1115 on opposite sides in the first direction DR1. A width of the first curvature portion 1115a in the first direction DR1 may increase toward the other side in the third direction DR3. For example, the first joint 1115 may have an inverted tapered shape in which the width thereof in the first direction DR1 increases toward the other side in the third direction DR3 in the first curvature portion 1115a. Accordingly, a joint protrusion portion 1115c having a maximum width of the first joint 1115 in the first direction DR1 may be formed at a boundary between the first curvature portion 1115a and the second curvature portion 1115b.

The second curvature portion 1115b may have a second curvature R2 which is concave into the first joint 1115 on opposite sides in the first direction DR1. A width of the second curvature portion 1115b in the first direction DR1 may decrease toward the other side in the third direction DR3. For example, the first joint 1115 may have a tapered shape in which the width thereof in the first direction DR1 decreases toward the other side in the third direction DR3 in the second curvature portion 1115b. Accordingly, a width 1115b_w in the first direction DR1 of an end of the other side of the second curvature portion 1115b in the third direction DR3 may be a minimum value of the width of the first joint 1115 in the first direction DR1. The second curvature R2 may be smaller than the first curvature R1. For example, a radius of curvature of the second curvature R2 may be greater than a radius of curvature of the first curvature R1. This may be a result of asymmetric etching in a manufacturing process of the display device 1_5 to be described later.

The joint protrusion portion 1115c may be a boundary between the first curvature portion 1115a and the second curvature portion 1115b. Based on the joint protrusion portion 1115c, the first curvature portion 1115a may be disposed on one side of the joint protrusion portion 1115c in the third direction DR3, and the second curvature portion 1115b may be disposed on the other side of the joint protrusion portion 1115c in the third direction DR3. A width of the joint protrusion portion 1115c in the first direction DR1 may be a maximum value of the width of the first joint 1110 in the first direction DR1.

A width 1115a_w in the first direction DR1 in which the first curvature portion 1115a and the adhesive layer ADH are in contact may be greater than a width 1115b_w in the first direction DR1 of an end of the other side of the second curvature portion 1115b in the third direction DR3. The width 1115a_w in the first direction DR1 in which the first curvature portion 1115a and the adhesive layer ADH are in contact may be smaller than the width of the joint protrusion portion 1115c in the first direction DR1. In some embodiments, the width of the joint protrusion portion 1115c in the first direction DR1 may be greater than the width 1115a_w in the first direction DR1 in which the first curvature portion 1115a and the adhesive layer ADH are in contact by approximately 0.1 mm, but is not necessarily limited thereto.

As described above, a shape of the first joint 1115 in a plan view may have the inverted tapered shape in which the width of the first joint 1115 in the first direction DR1 increases toward the other side in the third direction DR3 in the first curvature portion 1115a, may have the maximum width of the first joint 1115 in the first direction DR1 in the joint protrusion portion 1115c, and may have the tapered shape in which the width of the first joint 1115 in the first direction DR1 decreases from the joint protrusion portion 1115c to the other side in the third direction DR3.

Hereinafter, a manufacturing process of manufacturing the display device 1_5 according to the present embodiment will be described.

FIGS. 33 to 36 are cross-sectional views for each process for explaining a manufacturing process of manufacturing the display device according to the embodiment of FIG. 31.

Referring to FIGS. 33 to 36, a process of manufacturing the first joint 1115 of the display device 1_5 according to the embodiment of FIG. 31 is performed by asymmetric etching that forms a first mask MS1_5 on both side surfaces of a first material layer 1105" in the third direction DR3 and etches a portion of the first material layer 1105" exposed by the first mask MS1_5. For example, in the process of forming the first mask MS1_5 on both side surfaces of the first material layer 1105" in the third direction DR3, a photosensitive organic material is coated on both side surfaces of the first material layer 1105" in the third direction DR3, and is exposed and developed, thereby forming the first mask MS1_5 as a photoresist pattern on both surfaces of the first material layer 1105" in the third direction DR3. In addition, the process of etching the first material layer 1105" exposed by the first mask MS1_5 may be performed as a wet etch process. The first material layer 1105" may include a first joint material layer 1115" and a plate material layer 1135". The first joint material layer 1115" may form the first joint 1115 through a series of processes, and the plate material layer 1135" may form the plate 1135 through a series of processes.

Figure 33:
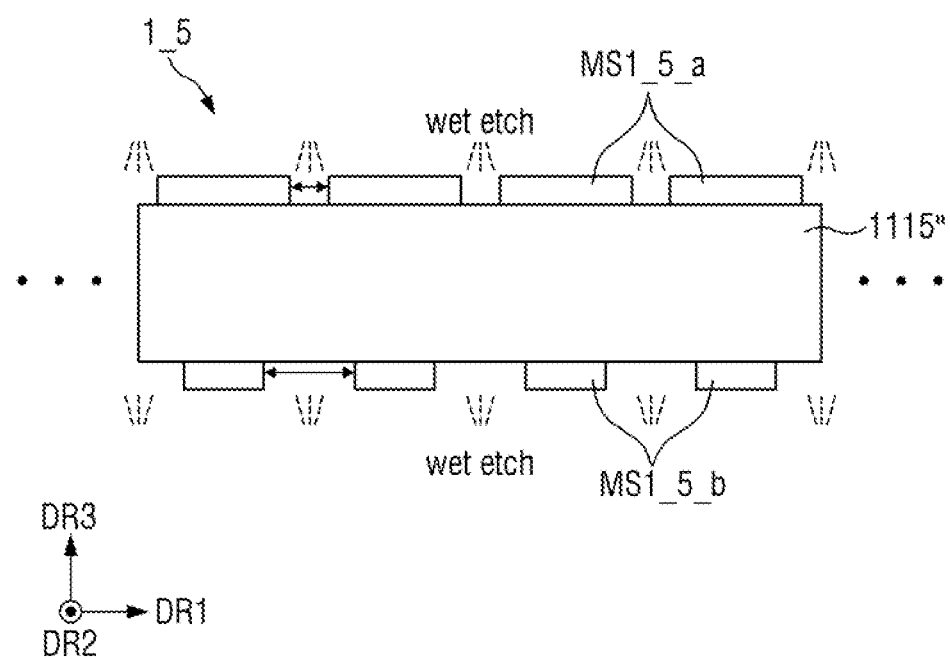
FIGS. 33 to 36 are cross-sectional views illustrating a manufacturing process of the display device according to the embodiment of FIG. 31.
Figure 34:
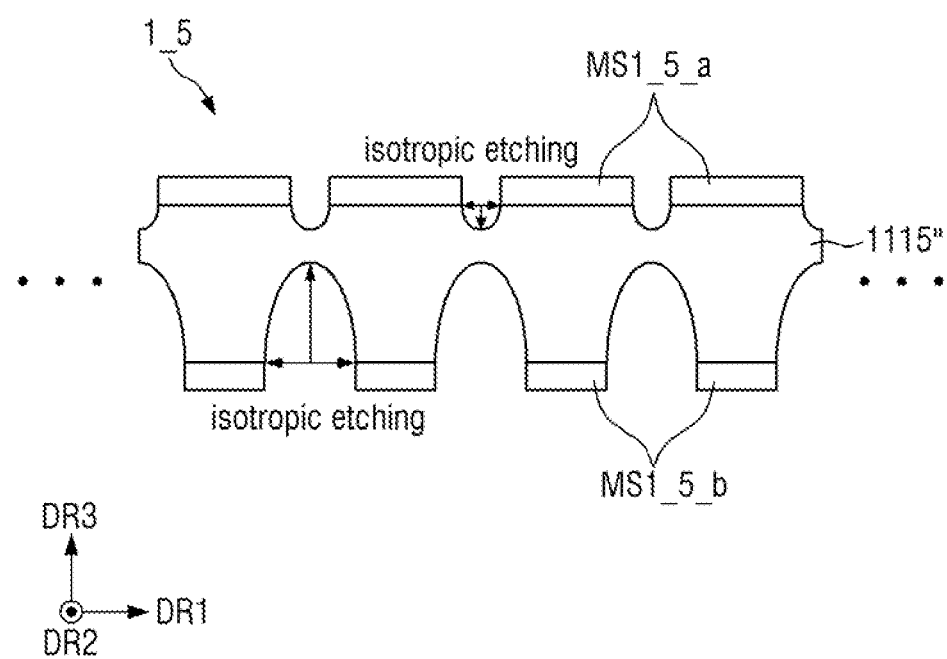

Referring to FIGS. 33 and 34, the process of forming the second support member SP_2 and the third support member SP_3 from the first material layer 1105" may be a process using a double mask. For example, the first mask MS1_5 may include a first_first mask MS1_5_a and a first_second mask MS1_5_b, the first_first mask MS1_5_a may be disposed on one side surface of the first joint material layer 1115" in the third direction DR3 and the first_second mask MS1_5_b may be disposed on the other side surface of the first joint material layer 1115" in the third direction DR3, and a width of the first material layer 1105" exposed by the first_first mask MS1_5_a may be narrower than a width of the first material layer 1105" exposed by the first_second mask MS1_5_b. Accordingly, the other side surface of the first material layer 1105'" in the third direction DR3 is isotropically etched with a relatively large radius of curvature, and one side surface of the first material layer 1105" in the third direction DR3 may be isotropically etched with a relatively small radius of curvature.

Figure 35:
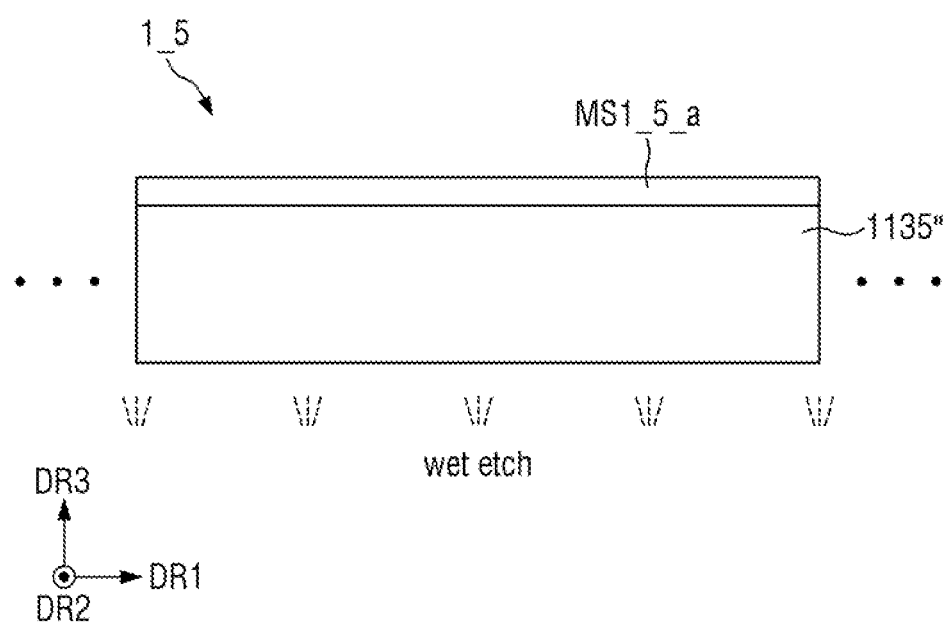
Figure 36:
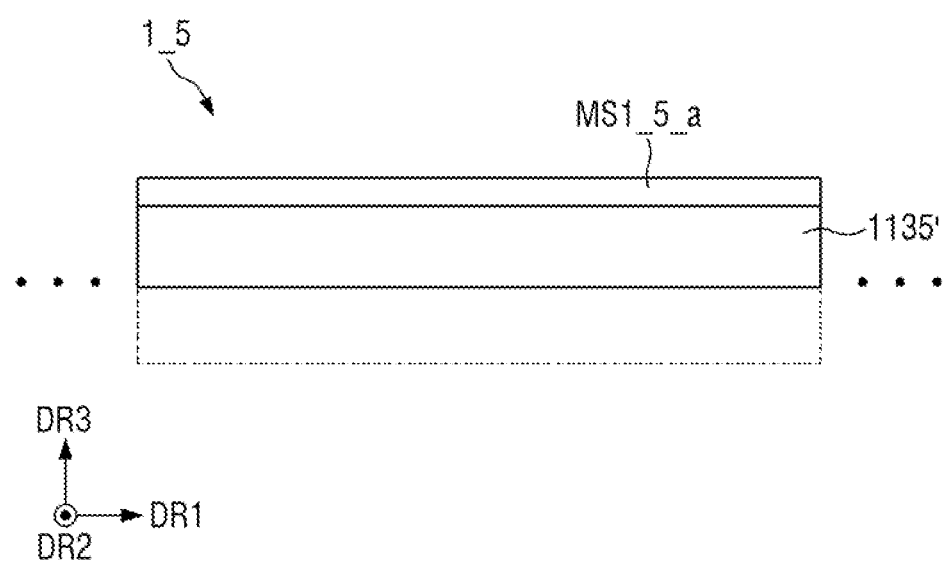

Referring to FIGS. 35 and 36, the process of forming the first support member SP5_1 from the first material layer 1105" may be a process using a single mask. For example, the first_first mask MS1_5_a may be disposed on one side surface of the plate material layer 1135" in the third direction DR3, but the first_second mask MS1_5_b might not be disposed on the other side surface of the plate material layer 1135" in the third direction DR3. The first_first mask MS1_5_a disposed on one side surface of the plate material layer 1135" in the third direction DR3 might not expose one side surface of the plate material layer 1135" in the third direction DR3. Accordingly, one side surface of the plate material layer 1135" in the third direction DR3 is not etched, but the other side surface of the plate material layer 1135" in the third direction DR3 is entirely etched, such that a width (hereinafter, referred to as 'thickness') of the plate material layer 1135" in the third direction DR3 may gradually decrease.

Figure 37:
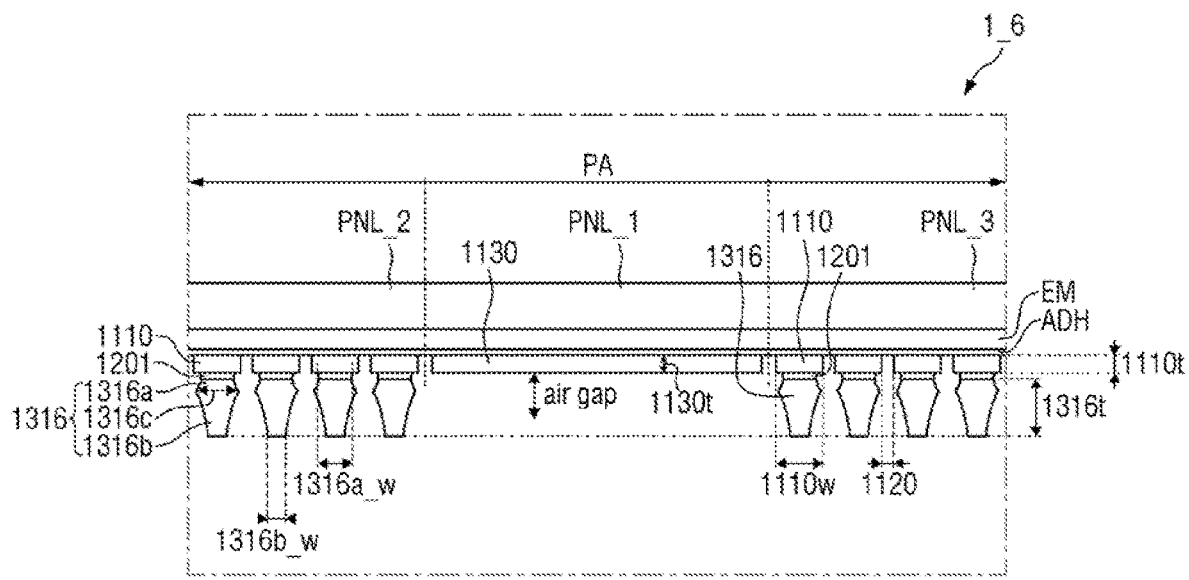
FIG. 37 is a cross-sectional view illustrating a stacked structure of a display panel and a support module of a display device according to an embodiment.

FIG. 37 is a cross-sectional view illustrating a stacked structure of a display panel and a support module of a display device according to an embodiment.

Referring to FIG. 37, a second joint 1316 of a display device 1_6, according to the present embodiment, is different from the embodiment of FIG. 23 in that it is asymmetrically etched. For example, the second joint 1316 according to the present embodiment may include a first curvature portion 1316a and a second curvature portion 1316b, and may be manufactured in substantially the same manufacturing method as the first joint 1115 according to the embodiment of FIG. 31.

A shape of the second joint 1316 in a plan view may have an inverted tapered shape in which a width of the second joint 1316 increases toward the other side in the third direction DR3 in the first curvature portion 1316a, may have a maximum width of the second joint 1316 in the first direction DR1 in a joint protrusion portion 1316c, and may have a tapered shape in which the width of the second joint 1316 in the first direction DR1 decreases from the joint protrusion portion 1316c to the other side in the third direction DR3.

Figure 38:
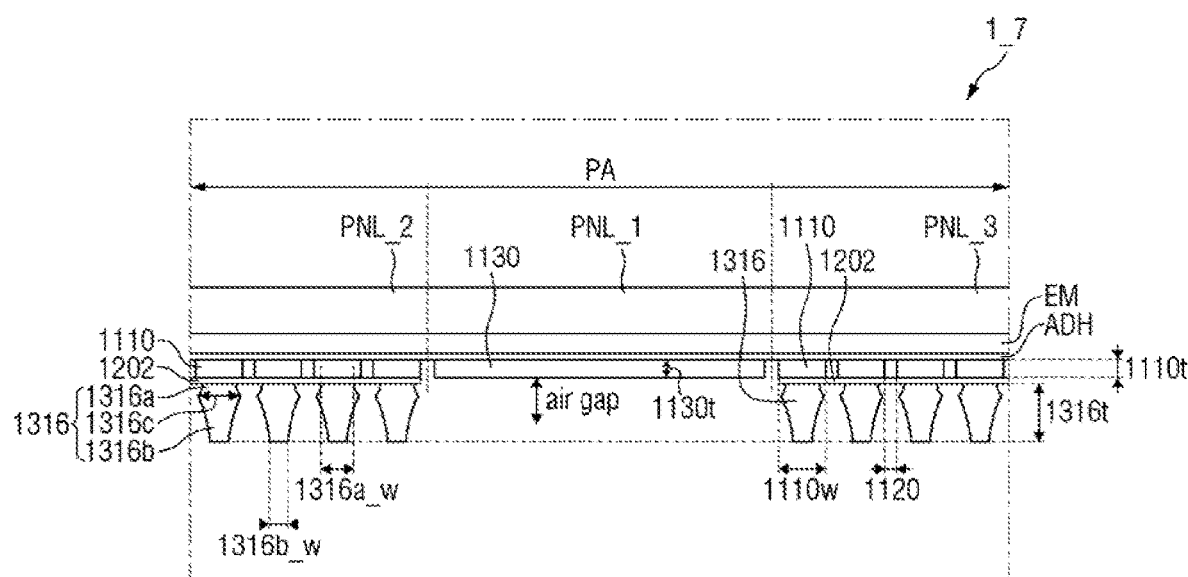
FIG. 38 is a cross-sectional view illustrating a stacked structure of a display panel and a support module of a display device according to an embodiment.

FIG. 38 is a cross-sectional view illustrating a stacked structure of a display panel and a support module of a display device according to an embodiment.

Referring to FIG. 38, a display device 1_7, according to the present embodiment, is different from the display device 1_6 according to the embodiment of FIG. 37 in that a joint adhesive film 1202 is disposed between the first joint 1110 and the second joint 1316, and other configurations are substantially the same or similar.

In concluding the detailed description, those skilled in the art will appreciate that many variations and modifications can be made to the described embodiments without substantially departing from the principles of the present disclosure.

What is claimed is:

1. A display device, comprising:
a display panel including a first area and a second area proximate to the first area in a first direction; and
a support module including a first support layer disposed on a bottom surface of the display panel and overlapping both the first area and the second area, and a second support layer disposed on a bottom surface of the first support layer, overlapping the second area, and not overlapping the first area,
wherein the first support layer of the support module includes:
a plurality of first joints spaced apart from each other in the first direction and overlapping the second area, and
a plate overlapping the first area,
wherein the second support layer of the support module includes a plurality of second joints that are spaced apart from each other in the first direction, and
wherein each of the plurality of second joints is disposed on a bottom surface of each of the plurality of first joints, and a width of each of the plurality of second joints is narrower than a width of each of the plurality of first joints.

2. The display device of claim 1,
wherein a top surface of each of the plurality of second joints is disposed in a central portion of the bottom surface of each of the plurality of first joints and is in direct contact with the first joint.

3. The display device of claim 2,
wherein a shape of each of the plurality of first joints and a shape of each of the plurality of second joints are substantially rectangular.

4. The display device of claim 1,
wherein the plurality of first joints, the plurality of second joints, and the plate include a same material.

5. The display device of claim 4,
wherein a thickness of each of the plurality of first joints and a thickness of the plate are substantially equal, and
wherein a thickness of each of the plurality of second joints is larger than the thickness of each of the plurality of first joints.

6. The display device of claim 5,
wherein the display panel further includes a third area disposed proximate to the first area in the first direction with the first area disposed between the second and third areas,
wherein the display panel further includes a sub area disposed proximate to the first area in a second direction intersecting the first direction,
wherein the first support layer of the support module overlaps the first area, the second area, and the third area, and the second support layer overlaps the second area and the third area and does not overlap the first area,
wherein the plurality of first joints of the first support layer overlap the second area and the third area, and are spaced apart from each other in the first direction,
wherein the plurality of second joints of the second support layer overlap the second area and the third area, and are spaced apart from each other in the first direction, and
wherein an air gap is disposed on a bottom surface of the plate of the first support layer.

7. The display device of claim 1,
wherein the plurality of first joints are spaced apart from each other by a first width, and
wherein the plurality of second joints are spaced apart from each other by a second width that is greater than the first width.

8. The display device of claim 7,
wherein the first width is 0.9 mm or less.

9. A display device, comprising:
a display panel including a flat area and a bendable area adjacent to the flat area in a first direction;
a first support formed on a bottom surface of the display panel and overlapping the flat area; and
a second support formed on the bottom surface of the display panel and overlapping the bendable area,
wherein the first support is a flat plate extending in the first direction and a second direction intersecting the first direction, and includes a same material as the second support,
wherein the second support includes:
a plurality of first joints extending in the second direction, spaced apart from each other by a first width in the first direction, and having a same thickness as the first support, and
a plurality of second joints extending in the second direction, spaced apart from each other in the first direction by a second width that is greater than the first width, and having a thickness that is greater than the first support, and
wherein each of the plurality of second joints is attached to a bottom surface of each of the plurality of first joints.

10. The display device of claim 9,
further comprising a plurality of first joint adhesive layers interposed between each of the plurality of first joints and each of the plurality of second joints,
wherein a width of each of the plurality of first joint adhesive layers is substantially equal to a width of each of the plurality of second joints.

11. The display device of claim 10,
wherein each of the plurality of first joint adhesive layers has an adhesive force of 1800 gf/25 mm or more.

12. The display device of claim 9,
further comprising a joint adhesive film interposed between the plurality of first joints and the plurality of second joints and adhering to the plurality of first joints and the plurality of second joints.

13. The display device of claim 12,
wherein a shape of the joint adhesive film is substantially equal to a shape of the bendable area of the display panel.

14. The display device of claim 13,
wherein the joint adhesive film includes a metal and has a thickness of 40 μm or less.

15. The display device of claim 13,
wherein the joint adhesive film includes a polymer film and has a modulus of elasticity of 4 GPa or more.

16. The display device of claim 13,
wherein the joint adhesive film is a mesh-type film including a plurality of fine holes each having a diameter of 300 μm or less.

17. A display device, comprising:
a display panel including a flat area and a bendable area adjacent to the flat area in a first direction;
a first support formed on a bottom surface of the display panel, overlapping the flat area, and extending in the first direction and a second direction intersecting the first direction; and a second support formed on the bottom surface of the display panel, overlapping the bendable area, extending in the second direction, and including a plurality of first joints spaced apart from each other in the first direction, wherein the first support and the second support include the same metal, wherein each of the plurality of first joints includes:

a first bent portion having a first degree of curvature which is concave in a direction toward the inside of each of the plurality of first joints, and a second bent portion positioned on a lower side of the first bent portion and having a second degree of curvature which is concave in the direction toward the inside of each of the plurality of first joints.

18. The display device of claim 17,
wherein a thickness of the first support is smaller than a thickness of each of the plurality of first joints.

19. The display device of claim 17,
wherein the first degree of curvature is greater than the second degree of curvature.

20. The display device of claim 19,
wherein the first joint includes a joint protrusion portion that is a boundary between the first bent portion and the second bent portion, and has a maximum width in the first direction at the joint protrusion portion.

* * * * *